(12) United States Patent
Mitsui

(10) Patent No.: US 12,499,339 B2
(45) Date of Patent: Dec. 16, 2025

(54) PRINTING APPARATUS, PRINT CONTROL APPARATUS, AND PRINT CONTROL PROGRAM

(71) Applicant: SEIKO EPSON CORPORATION, Tokyo (JP)

(72) Inventor: Yoichi Mitsui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 238 days.

(21) Appl. No.: 18/493,985

(22) Filed: Oct. 25, 2023

(65) Prior Publication Data

US 2024/0143964 A1 May 2, 2024

(30) Foreign Application Priority Data

Oct. 27, 2022 (JP) ................. 2022-172122

(51) Int. Cl.
*G06K 15/02* (2006.01)
*B41J 11/66* (2006.01)

(52) U.S. Cl.
CPC ........... *G06K 15/181* (2013.01); *B41J 11/663* (2013.01); *G06K 15/1867* (2013.01)

(58) Field of Classification Search
USPC ....................................................... 358/1.15
See application file for complete search history.

(56) References Cited

U.S. PATENT DOCUMENTS

| 8,830,507 B2 | 9/2014 | Matsuzawa |
| 2008/0024807 A1* | 1/2008 | Matsuda ............ G03G 15/5087 358/1.12 |
| 2009/0059285 A1 | 3/2009 | Akashi |
| 2012/0200885 A1 | 8/2012 | Matsuzawa |

FOREIGN PATENT DOCUMENTS

JP 2012-161935 A 8/2012

* cited by examiner

*Primary Examiner* — Jacky X Zheng
(74) *Attorney, Agent, or Firm* — WORKMAN NYDEGGER

(57) ABSTRACT

In a printing apparatus, when an image printed based on image data of an n-th print job as an n-th print target among designated two or more print jobs is an n-th image, and an image printed based on image data of a (n+1)-th print job as a (n+1)-th print target among the designated two or more print jobs is a (n+1)-th image, n-th post-processing setting information and (n+1)-th post-processing setting information are compared to determine whether or not setting of the post-processing needs to be changed, and when the setting of the post-processing does not need to be changed, print setting is changed so as not to print information based on post-processing setting information set to be printed at a position between the n-th image and the (n+1)-th image on the medium.

18 Claims, 17 Drawing Sheets

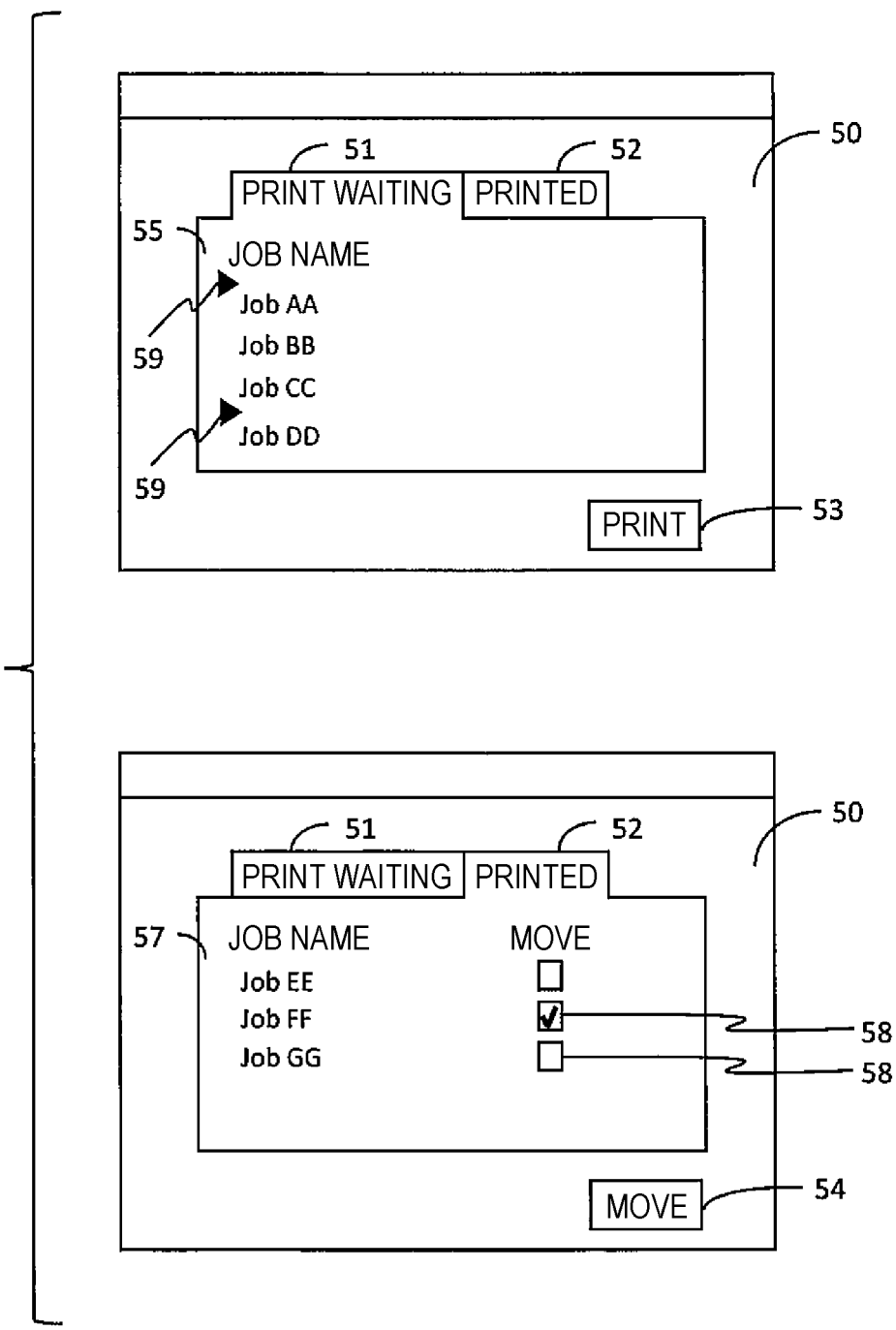

| No. | FIRST PRINT MODE (TEST PRINT) | SECOND PRINT MODE (ACTUAL PRINT) |
|---|---|---|
| 1 | INITIAL SETTING INFORMATION | INCIDENTAL SETTING INFORMATION |
| 2 | INITIAL SETTING INFORMATION | SECOND SETTING INFORMATION FILE |
| 3 | INCIDENTAL SETTING INFORMATION | SECOND SETTING INFORMATION FILE |
| 4 | FIRST SETTING INFORMATION FILE | INCIDENTAL SETTING INFORMATION |
| 5 | FIRST SETTING INFORMATION FILE | SECOND SETTING INFORMATION FILE |

PROJECT NO. : 12345

DUE DATE : 2022/06/01

IMAGE FILE : LABEL1.PDF

NUMBER OF PRINT COPIES : 30 COPIES

FRONT MARGIN: ○○ mm   REAR MARGIN: ○○ mm

PRIMARY POST-PROCESS : XXX   BLADE TYPE : aaa

SECONDARY POST-PROCESS : YYY   NUMBER OF SLITS : 2

FIG. 7

| | |
|---|---|
| Job AA | PROJECT NO. 12345, DUE DATE ---, NUMBER OF PRINT COPIES = 30, FRONT MARGIN ○○ mm, REAR MARGIN ○○ mm, PRIMARY POST-PROCESS ---, SECONDARY POST-PROCESS --- |
| Job BB (G1) | PROJECT NO. 10111, DUE DATE ---, NUMBER OF PRINT COPIES = 40, FRONT MARGIN ○○ mm, REAR MARGIN ○○ mm, PRIMARY POST-PROCESS ---, SECONDARY POST-PROCESS --- |
| Job FF (G1) | PROJECT NO. 10222, DUE DATE ---, NUMBER OF PRINT COPIES = 50, FRONT MARGIN ○○ mm, REAR MARGIN ○○ mm, PRIMARY POST-PROCESS ---, SECONDARY POST-PROCESS --- |
| Job CC (G1) | PROJECT NO. 21111, DUE DATE ---, NUMBER OF PRINT COPIES = 30, FRONT MARGIN ○○ mm, REAR MARGIN ○○ mm, PRIMARY POST-PROCESS ---, SECONDARY POST-PROCESS --- |

FIG. 8

| | PRIMARY POST-PROCESSING MACHINE | BLADE DIE | SECONDARY POST-PROCESSING MACHINE | NUMBER OF SLITS |
|---|---|---|---|---|
| Job BB | XXX | bbb | YYY | 2 |
| Job FF | XXX | aaa | YYY | 4 |
| Job CC | XXX | aaa | YYY | 4 |

FIG. 13A

| | PRIMARY POST-PROCESSING MACHINE | BLADE DIE | SECONDARY POST-PROCESSING MACHINE | NUMBER OF SLITS |
|---|---|---|---|---|
| Job FF | XXX | aaa | YYY | 2 |
| Job CC | XXX | aaa | YYY | 4 |
| Job BB | ZZZ | bbb | YYY | 4 |
| Job AA | ZZZ | ccc | YYY | 4 |

FIG. 13B

| | PRIMARY POST-PROCESSING MACHINE | BLADE DIE | SECONDARY POST-PROCESSING MACHINE | NUMBER OF SLITS |
|---|---|---|---|---|
| Job AA | XXX | bbb | YYY | 2 |
| Job BB | XXX | bbb | YYY | 2 |
| Job FF | XXX | aaa | YYY | 4 |
| Job CC | XXX | aaa | YYY | 4 |

FIG. 13C

PRINTING APPARATUS, PRINT CONTROL APPARATUS, AND PRINT CONTROL PROGRAM

The present application is based on, and claims priority from JP Application Serial Number 2022-172122, filed Oct. 27, 2022, the disclosure of which is hereby incorporated by reference herein in its entirety.

BACKGROUND

1. Technical Field

The present disclosure relates to a printing apparatus, a print control apparatus and a print control program.

2. Related Art

JP-A-2012-161935 discloses a printing system capable of performing post-processing on a printed matter which is offline after printing.

According to JP-A-2012-161935, the printing system includes a storage unit that stores print job data and post-processing job data in association with each other, a printing unit that prints a code related to the association on a medium when an image is printed on the medium based on the print job data, a code reading unit that reads the code printed on the medium, and a post-processing unit that selects the post-processing job data associated with the print job data from the storage unit based on the read code and performs post-processing on the medium based on the selected post-processing job data.

According to JP-A-2012-161935, a code is printed corresponding to each of all print jobs. There may be no change in settings related to the post-processing between a print job printed on a medium and a print job printed on a medium subsequent to the print job. In such a case, when the code is read, since there is no change in the setting of the post-processing between the successive preceding and succeeding print jobs, the post-processing is performed with the same setting for the print results of the preceding and succeeding print jobs, but as a result, it can be said that the printing of the code corresponding to the succeeding print job is wasteful. Therefore, there is a demand for improvement for performing printing necessary for post-processing while curbing waste of a medium and ink.

SUMMARY

The printing apparatus includes a printing unit configured to print an image on a medium based on image data, a storage unit configured to store a print job including the image data, and a control unit configured to perform print setting on the printing unit based on print setting information including post-processing setting information indicating setting of post-processing to be performed on the medium on which the image is printed and configured to cause the printing unit to print two or more designated print jobs among a plurality of print jobs stored in the storage unit, wherein when n is an integer greater than or equal to 1, and an image printed on the medium based on image data of an n-th print job as an n-th print target by the printing unit among the two or more print jobs is an n-th image, and an image printed on the medium based on image data of a (n+1)-th print job as a (n+1)-th print target by the printing unit among the two or more print jobs is a (n+1)-th image, and the post-processing setting information associated with the n-th print job is n-th post-processing setting information, and the post-processing setting information associated with the (n+1)-th print job is (n+1)-th post-processing setting information, the control unit compares the n-th post-processing setting information with the (n+1)-th post-processing setting information to determine whether or not setting of the post-processing needs to be changed, and changes the print setting so as not to print information based on the post-processing setting information set to be printed at a position between the n-th image and the (n+1)-th image on the medium as the print setting for the printing unit when the setting of the post-processing does not need to be changed.

A print control apparatus communicably coupled to a printing apparatus includes a storage unit configured to store a print job including image data, a control unit configured to perform print setting on the printing apparatus based on print setting information including post-processing setting information indicating setting of post-processing to be performed on a medium on which an image based on the image data is printed and configured to cause the printing apparatus to print two or more designated print jobs among a plurality of print jobs stored in the storage unit, wherein when n is an integer greater than or equal to 1, and an image printed on the medium based on image data of an n-th print job as an n-th print target by the printing apparatus among the two or more print jobs is an n-th image, and an image printed on the medium based on image data of a (n+1)-th print job as a (n+1)-th print target by the printing apparatus among the two or more print jobs is a (n+1)-th image, and the post-processing setting information associated with the n-th print job is n-th post-processing setting information, and the post-processing setting information associated with the (n+1)-th print job is (n+1)-th post-processing setting information, the control unit compares the n-th post-processing setting information with the (n+1)-th post-processing setting information to determine whether or not setting of the post-processing needs to be changed, and changes the print setting so as not to print information based on the post-processing setting information set to be printed at a position between the n-th image and the (n+1)-th image on the medium as the print setting for the printing apparatus when the setting of the post-processing does not need to be changed.

A non-transitory computer-readable storage medium storing a print control program, the print control program being configured to perform print setting on a printing unit based on print setting information including post-processing setting information indicating setting of post-processing to be performed on a medium on which the image is printed based on image data included in a print job, and cause a processor to perform a print control function that causes the printing unit to print two or more designated print jobs among a plurality of print jobs, wherein when n is an integer greater than or equal to 1, and an image printed on the medium based on image data of an n-th print job as an n-th print target by the printing unit among the two or more print jobs is an n-th image, and an image printed on the medium based on image data of a (n+1)-th print job as a (n+1)-th print target by the printing unit among the two or more print jobs is a (n+1)-th image, and the post-processing setting information associated with the n-th print job is n-th post-processing setting information, and the post-processing setting information associated with the (n+1)-th print job is (n+1)-th post-processing setting information, the print control function compares the n-th post-processing setting information with the (n+1)-th post-processing setting information to determine whether or not setting of the post-processing needs to be changed, and changes the print setting so as not to print information based on the post-processing setting information set to be printed at a position between the n-th image and the (n+1)-th image on the medium as the print setting for the printing unit when the setting of the post-processing does not need to be changed.

BRIEF DESCRIPTION OF THE DRAWINGS

FIG. 5 is a diagram illustrating an example of a management screen different from that illustrated in FIG. 4.

FIG. 6 is a diagram illustrating combinations of acquisition sources of specific setting information in a table format.

FIG. 7 is a diagram illustrating accompanied setting information of a print job.

FIG. 8 is a diagram illustrating a second setting information file.

FIG. 13A is a diagram illustrating post-processing setting information for each of print jobs of one collective print job group in a table format, FIG. 13B is a diagram illustrating post-processing setting information for each of print jobs of another collective print job group in a table format, and FIG. 13C is a diagram illustrating post-processing setting information for each of print jobs according to a third printing example in a table format.

DESCRIPTION OF EMBODIMENTS

Embodiments of the present disclosure are described below with reference to the drawings. Each of the drawings is merely illustrative for describing the embodiments. Since the drawings are illustrative, proportions, shapes, and shading may not be precise, consistent, or may be partially omitted.

1. Outline of Apparatus Configuration

Figure 1:
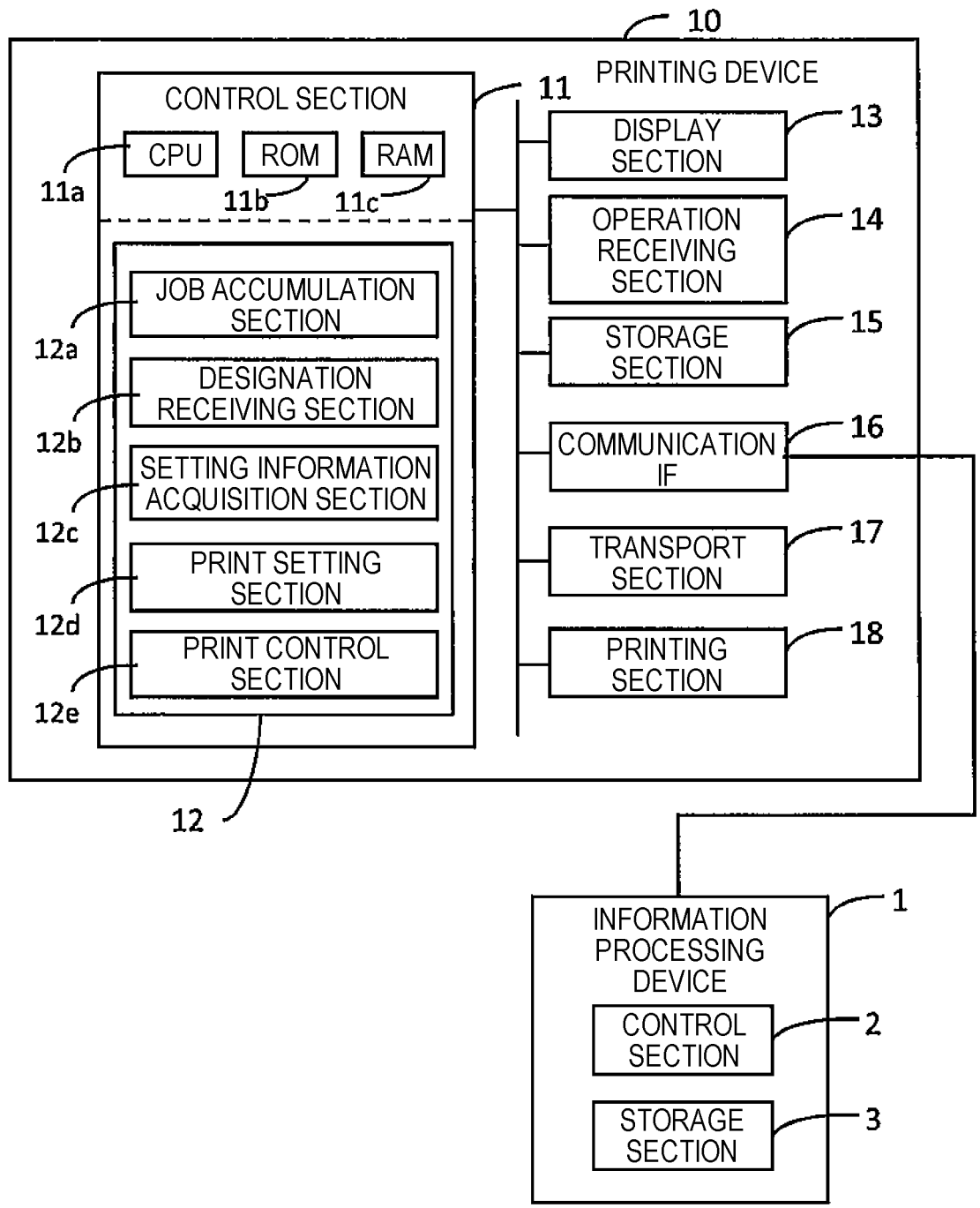
FIG. 1 is a block diagram simply illustrating an apparatus configuration according to an embodiment.

FIG. 1 illustrates a configuration of a printing apparatus 10 according to the present embodiment in a simplified manner.

The printing apparatus 10 includes a control unit 11, a display unit 13, an operation reception unit 14, a storage unit 15, a communication IF 16, a transport unit 17, a printing unit 18, and the like. IF is an abbreviation for interface. The control unit 11 includes, as a processor, one or more ICs including a CPU 11a, a ROM 11b, a RAM 11c, and the like, another non-volatile memory, and the like.

In the control unit 11, the processor, that is, the CPU 11a performs arithmetic processing in accordance with programs 12 stored in the ROM 11b, the other memory, or the like, using the RAM 11c or the like as a work region, to realize various functions such as a job accumulation unit 12a, a designation reception unit 12b, a setting information acquisition unit 12c, a print setting unit 12d, a print control unit 12e, and the like. The program 12 corresponds to a print control program. The processor is not limited to a single CPU, and a configuration may be adopted in which the processing is performed by a hardware circuit such as a plurality of CPUs, an ASIC, or the like, or a configuration may be adopted in which the CPU and the hardware circuit work in concert to execute the processing.

The display unit 13 is a unit for displaying visual information, and is configured, for example, of a liquid crystal display, an organic EL display, or the like. The display unit 13 may include a display and a drive circuit for driving the display. The operation reception unit 14 is a unit for receiving an operation and an input by a user, and is realized, for example, by a physical button, a touch panel, a mouse, a keyboard, or the like. The display unit 13 and the operation reception unit 14 may be collectively referred to as an operation panel of the printing apparatus 10. The operation reception unit 14 as a touch panel is implemented as one function of the display unit 13. The display unit 13 may be considered to include the operation reception unit 14.

For example, the storage unit 15 is a storage unit such as a hard disk drive, a solid state drive, and another memory. Part of the memory of the control unit 11 may be regarded as the storage unit 15. The storage unit 15 may be regarded as part of the control unit 11.

The communication IF 16 is a generic term for one or a plurality of IFs for establishing communication between the printing apparatus 10 and an external device in a wired or wireless manner, in accordance with a prescribed communication protocol including a known communication standard. The communication IF 16 is also referred to as a communication unit. For example, the external device is an information processing device such as a personal computer (PC), a server, a smart phone, or a tablet terminal. In the example of FIG. 1, the printing apparatus 10 is coupled to the information processing device 1 via the communication IF 16. The number of external devices to which the printing apparatus 10 is communicatively coupled is not limited to one. The information processing device 1 includes a control unit 2 including a processor capable of executing a program or an application, and a storage unit 3. Needless to say, the information processing device 1 appropriately has various functions and configurations that a PC or the like generally has.

The transport unit 17 is a unit for transporting the medium 30 along a predetermined transport path under the control of the control unit 11. For example, the transport unit 17 includes a roller that rotates to transport the medium 30, a motor as a driving source for rotation, and the like. Further, the transport unit 17 may be a mechanism that transports the medium 30 by mounting the medium 30 on a motor-driven drum, belt, or pallet. The medium 30 is, for example, paper, but may be any medium that can be printed on, and may be a material other than paper, such as film or cloth. In addition, the medium 30 may be label paper including a mount and a label separably attached to the mount.

The printing unit 18 is a unit that performs printing on the medium 30 using a color material such as ink or toner under the control of the control unit 11. A printing method employed by the printing unit 18 is not particularly limited, and may include various methods such as an inkjet method, and an electrophotographic method. When the printing unit 18 is configured to employ an inkjet method, the printing unit 18 includes a print head having a plurality of nozzles capable of ejecting ink dots.

The printing apparatus 10 is a single printer in which the configuration is integrated.

Alternatively, the printing apparatus 10 may be a printing system realized by coupling a plurality of apparatuses or devices to be able to communicate with each other. In the example of FIG. 1, a configuration including the printing apparatus 10 and the information processing device 1 can be regarded as a printing system. The information processing device 1 can be understood as a print control apparatus that controls the printing apparatus 10. The display unit 13, the operation reception unit 14, and the storage unit 15 may be parts of a printer as the printing apparatus 10 or may be peripheral devices coupled to the printer.

Figure 2:
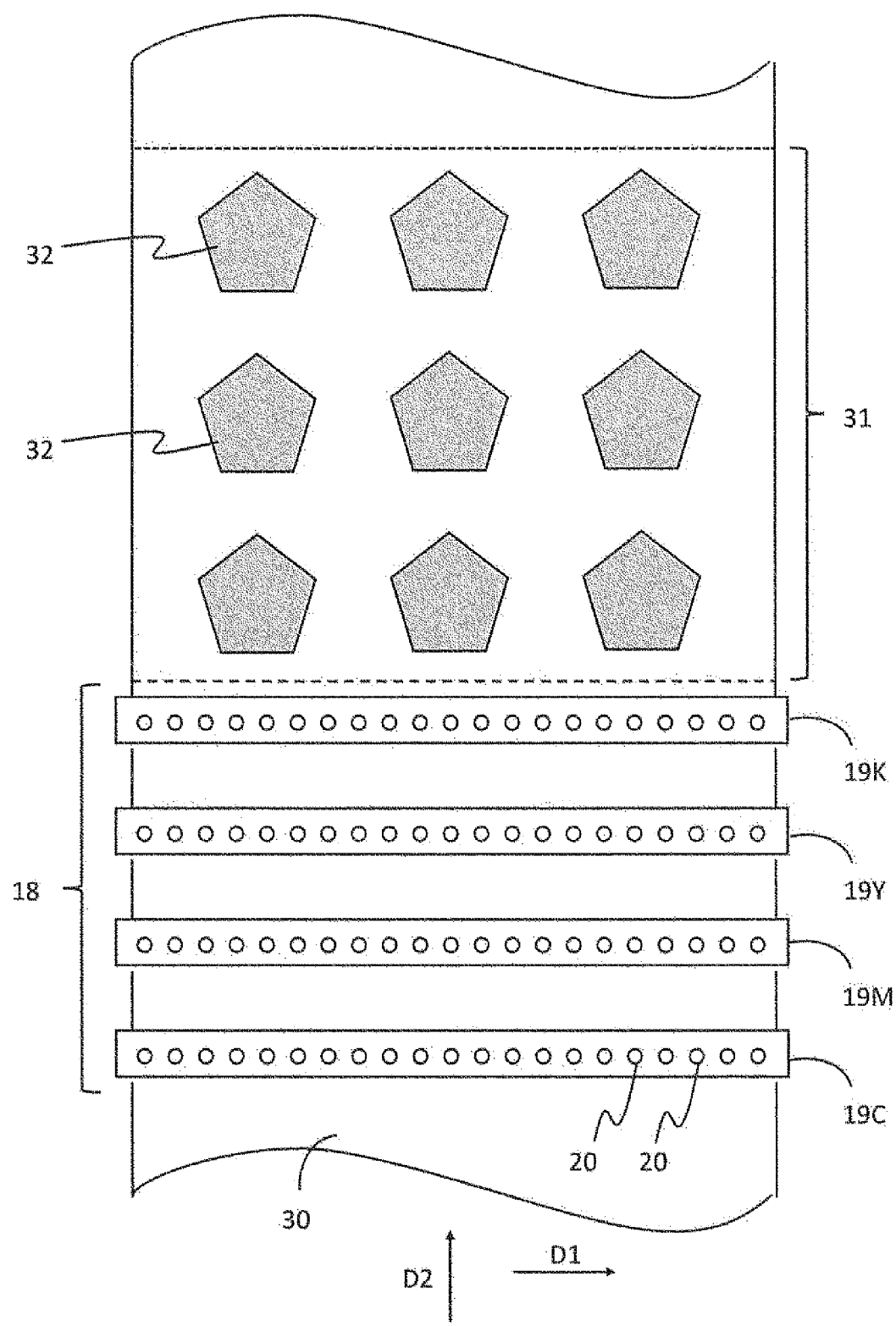
FIG. 2 is a diagram simply illustrating the relationship between a medium and a printing unit as seen from above.

FIG. 2 simply shows the relationship between the printing unit 18 and the medium 30 according to an example from a viewpoint from above. In the example of FIG. 2, the printing unit 18 includes print heads 19C, 19M, 19Y, and 19K. Each of the print heads 19C, 19M, 19Y, and 19K includes a plurality of nozzles 20 capable of ejecting ink. Each white circle illustrated in FIG. 2 is an individual nozzle 20. The printing unit 18 ejects multiple types of ink. As the ink, for example, each color ink such as cyan (C), magenta (M), yellow (Y), and black (K) is assumed. The printing unit 18 may be capable of ejecting various liquids such as white ink, ink of other colors, a reaction liquid, and a coating liquid.

FIG. 2 very simply shows a configuration in which the plurality of nozzles 20 are arranged at constant or substantially constant intervals in a first direction D1 in each of the print heads 19C, 19M, 19Y, and 19K. A second direction D2 intersecting the first direction D1 is a transport direction D2 of the medium 30 by the transport unit 17, and the transport unit 17 transports the medium 30 from upstream to downstream in the transport direction D2. In the following description, including the description of post-processing, "upstream" means upstream of transport during printing, and "downstream" means downstream of transport during printing. The first direction D1 and the transport direction D2 are orthogonal or substantially orthogonal to each other. The first direction D1 may be referred to as a widthwise direction D1 of the medium 30. The transport path of the medium 30 may include a curve in the process from upstream to downstream.

The print head 19C is a print head in which a plurality of nozzles 20 for ejecting C ink are arranged. Similarly, the print head 19M is a print head in which a plurality of nozzles 20 for ejecting M ink are arranged, the print head 19Y is a print head in which a plurality of nozzles 20 for ejecting Y ink are arranged, and the print head 19K is a print head in which a plurality of nozzles 20 for ejecting K ink are arranged. The plurality of print heads 19C, 19M, 19Y, and 19K are arranged in the transport direction D2 and are located at the same position in the widthwise direction D1. Further, each of the print heads 19C, 19M, 19Y, and 19K has a length in the widthwise direction D1 so as to cover a width of the medium that is a length of the medium 30 in the widthwise direction D1.

In FIG. 2, the nozzle arrangement direction in which the plurality of nozzles 20 constituting the same print head are arranged is parallel to the widthwise direction D1, but the nozzle arrangement direction may obliquely intersect the widthwise direction D1. In addition, in FIG. 2, the print heads 19C, 19M, 19Y, and 19K are separated and independent from each other in the transport direction D2, but the print heads 19C, 19M, 19Y, and 19K may be a head unit in which they are integrally formed.

The control unit 11 causes the printing unit 18 to eject the ink onto the medium 30 based on print data indicating an image of the print job. As is known, in the print heads 19C, 19M, 19Y, and 19K, a driving element is provided to each of the nozzles 20, application of a driving signal to the driving element of each of the nozzles 20 is controlled in accordance with the print data to cause each of the nozzles 20 to eject dots or not to eject dots, and thus the image indicated by the print data is printed on the medium 30. The control unit 11 controls the transport unit 17 and the printing unit 18 to eject the ink onto the medium 30 passing under the print heads 19C, 19M, 19Y, and 19K, and thus the image is printed on the medium 30.

In the example of FIG. 2, the medium 30 is a long medium that is continuous in the transport direction D2. A region having a constant size indicated by a reference numeral 31 in the medium 30 is a unit region of printing by the printing unit 18 and is referred to as a frame 31. That is, the medium 30 is configured by coupling a plurality of frames 31. Dashed lines separating the frames 31 illustrated in FIG. 2 may or may not be actually present. Although not illustrated, a "roll body" in which the long medium 30 is wound in a roll shape is disposed at a predetermined position upstream of the printing unit 18, and the medium 30 is fed out downstream from the rotating roll body and passes under the print heads 19C, 19M, 19Y, and 19K. In addition, the medium 30 on which printing is performed by the printing unit 18 is transported to the downstream as it is, is wound into a roll shape again by a winding device (not illustrated), and is collected as a roll body. The roll body may be referred to as roll paper.

In the example of FIG. 2, a plurality of objects 32 are printed in a frame 31 downstream of the printing unit 18. Here, the medium 30 is a label sheet, and a plurality of objects 32 are printed in one frame 31. That is, in the example of FIG. 2, the print data is data for printing a group of the plurality of objects 32 in the frame 31.

A specific example of the printing unit 18 employing the inkjet method is not limited to the configuration illustrated in FIG. 2. For example, the printing unit 18 may include a movable carriage on which the print heads 19C, 19M, 19Y, and 19K are mounted. Under the control of the control unit 11, the carriage may move parallel to the first direction D1 and/or the second direction D2, and during this movement, the print heads 19C, 19M, 19Y, and 19K may perform printing by ejecting ink onto the medium 30 of which transport is temporarily stopped. The nozzle arrangement direction of the print heads 19C, 19M, 19Y, and 19K mounted on the carriage may be directed in the second direction D2 instead of the first direction D1.

2. Print Control Processing

Figure 3:
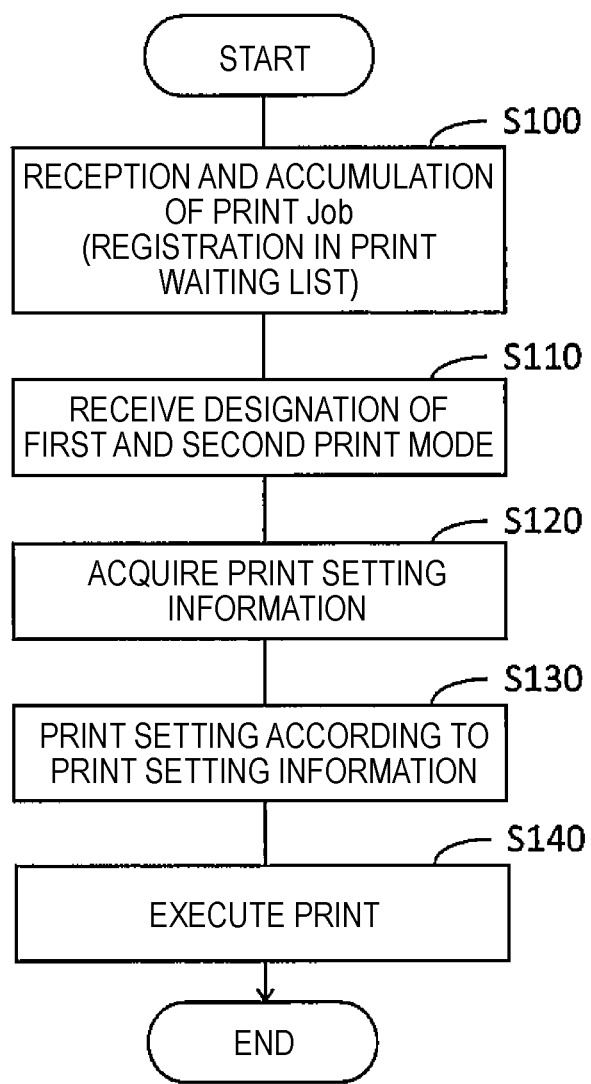
FIG. 3 is a flowchart illustrating print control processing.

FIG. 3 is a flow chart illustrating print control processing performed by the control unit 11 according to the program 12 in response to an input and an instruction. A printing method is disclosed by the description of the print control processing.

A user operates an external device such as the information processing device 1 to transmit a print job to the printing apparatus 10. For example, the user accesses the printing apparatus 10 through an UI screen of an external device and performs an operation of moving a desired print job to a predetermined folder included in the printing apparatus 10. Thus, the user can transmit the print job to the printing apparatus 10. Here, UI is an abbreviation for "user interface."

The job accumulation unit 12a of the control unit 11 accumulates the print job transmitted from the external device and received by the communication IF 16 in the storage unit 15 (Step S100). Step S100 corresponds to an accumulation step of receiving a print job through communication with the outside and accumulating the print job in the storage unit 15. Accumulation may be rephrased as storage or saving. The print job includes image data representing an image of a target to be printed such as the object 32. The print job may also be accompanied by print setting information for image printing. In the present embodiment, the term "accompanying" refers to a state in which data or a file is accompanied by other data or includes other data. The print setting information attached to the print job corresponds to "accompanied setting information." The image data is generated in a format such as a portable document format (PDF). Further, the accompanied setting information is, for example, information described in a format such as a job definition format (JDF).

The accompanied setting information may be, for example, a part of information described in a header of image data included in the print job.

Since the print data is obtained by converting the image data of such a print job into a format used for printing by the printing unit 18, the image data and the print data need not be particularly distinguished from each other. This conversion is known processing such as color conversion processing or halftone processing. Referring to the example of FIG. 2, the print data is data that defines dot ejection or non-ejection for each pixel and for each C, M, Y, and K ink. Printing an image based on image data (print data) of a print job is also simply referred to as printing the print job.

Although Step S100 is described as one step in the flowchart in FIG. 3, actually, the print job is transmitted to the printing apparatus 10 at an arbitrary timing of the user who operates the external device, and the job accumulation unit 12a accumulates the print job in the storage unit 15 every time the communication IF 16 receives the print job. The job accumulation unit 12a first registers the print jobs accumulated in the storage unit 15 in a "print waiting list." The job accumulation unit 12a manages statuses of the print jobs, such as print waiting and print completion, using the print waiting list and a "print completion list."

The designation reception unit 12b receives designation of a "first print mode" or a "second print mode" for one or more print jobs accumulated in the storage unit 15 (Step S110). In the present embodiment, an amount of consumption of the medium 30 in the printing of one print job in the second print mode is greater than an amount of consumption of the medium 30 in the printing of one print job in the first print mode. Specifically, the first print mode is a print mode for performing "test printing" of an image on the medium 30, and the second print mode is a print mode for "main printing" of outputting a print result as a product. The user can perform the test printing of a certain print job, can confirm a print result, and then can perform main printing of the print job.

Figure 4:
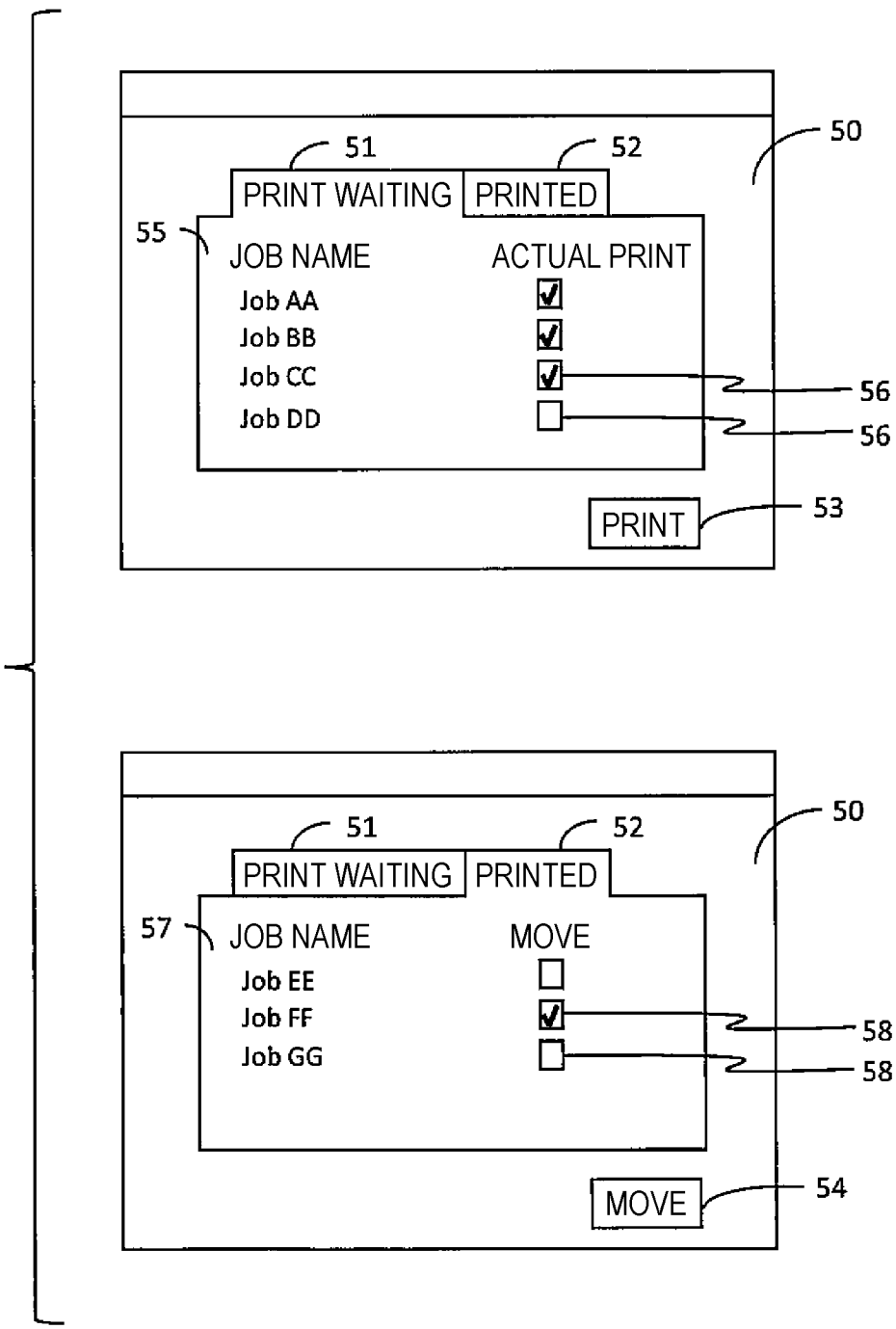
FIG. 4 is a diagram illustrating an example of a management screen.

FIG. 4 illustrates a management screen 50 of the print job as a type of an UI screen displayed on the display unit 13 by the control unit 11. Referring to FIG. 4, the management screen 50 includes a print waiting tab 51, a print completion tab 52, a print button 53, a job transfer button 54, and the like. The user can switch a display content of the management screen 50 by arbitrarily selecting and operating the print waiting tab 51 and the print completion tab 52. The print waiting tab 51 is a tab for displaying a current print waiting list 55, and the print completion tab 52 is a tab for displaying a current print completion list 57.

In the upper part of FIG. 4, the print waiting tab 51 is selected and the print waiting list 55 is displayed, and in the lower part of FIG. 4, the print completion tab 52 is selected and the print completion list 57 is displayed. The print waiting list 55 is basically a list of the print jobs that have not yet been printed. In addition, in the print waiting list 55, basically, a print job transmitted from an external device in an earlier order is displayed at a higher position in the list. For example, in the print waiting list 55, print jobs such as a print job AA, a print job BB, a print job CC, and a print job DD are registered in this order. The print completion list 57 is a list of print jobs of which printing has been completed. The job accumulation unit 12a deletes the print job of which printing has been completed from the print waiting list 55 and registers the print job in the print completion list 57. For example, print jobs such as a print job EE, a print job FF, and a print job GG are registered in the print completion list 57.

The user may arbitrarily select a print job in the print completion list 57 and may return it to the print waiting list 55. According to FIG. 4, a selection field 58 is displayed as a check box for each of the print jobs in the print completion list 57. The user operates the operation reception unit 14 to check the selection field 58 corresponding to a print job to be returned from the print completion list 57 to the print waiting list 55 to set the selection field 58 to a selected state, and then presses the job transfer button 54. In response to such an operation, the job accumulation unit 12a deletes the print job selected in the print completion list 57 from the print completion list 57 and registers the print job in the print waiting list 55 again. Therefore, the print waiting list 55 may include print jobs that have been printed one or more times.

According to FIG. 4, in the print waiting list 55, a selection field 56 is displayed as a check box for each of the print jobs. The user operates the operation reception unit 14 to check the selection field 56 corresponding to a print job to be a target of main printing among the print jobs in the print waiting list 55 to set the selection field 56 to a selected state. In the print waiting list 55, a print job in a non-selection state in which the selection field 56 is not checked becomes a target of test printing. In the example of FIG. 4, the print job AA, the print job BB, and the print job CC are the targets of the main printing, and the print job DD is the targets of the test printing.

That is, the designation reception unit 12b receives designation of the second print mode or the first print mode for each of the print jobs according to whether or not each of the selection fields 56 in the print waiting list 55 is selected. In this state, when the print button 53 is pressed by the user's operation, the designation of the first print mode or the second print mode for each of the print jobs in the print waiting list 55 is confirmed, and the process proceeds from Step S110 to Step S120. As can be understood from the description related to FIG. 4, the user may set one print job stored in the storage unit 15 as a target of the test printing any number of times and may set the print job as a target of the main printing any number of times.

FIG. 5 is a management screen 50 of the print job displayed on the display unit 13 by the control unit 11, and shows an example different from that in FIG. 4. Description of FIG. 5 common to FIG. 4 will be omitted. The management screen 50 of FIG. 5 is different from the management screen 50 of FIG. 4 in how to select the main printing or the test printing for the print job.

The user may operate the operation reception unit 14 to input a position mark 59 and to select a range of the print job to be the target of the main printing in the print waiting list 55. In the example of FIG. 5, in the print waiting list 55, the print job AA, the print job BB, and the print job CC are defined as a selection range between the position marks 59, and become the targets of the main printing. In the print waiting list 55, a print job DD which is not included in the selection range by the position mark 59 becomes a target of the test printing. In this way, the designation reception unit 12b receives a state that is not included in the selection range input by the user in the print waiting list 55 as the designation of the first print mode, and receives a state that is included in the selection range as the designation of the second print mode. When the print button 53 is pressed in such a state, the designation of the first print mode or the second print mode for each of the print jobs in the print waiting list 55 is confirmed, and the process proceeds from Step S110 to Step S120.

It goes without saying that the design of the position mark 59 is not limited to the triangular design as illustrated in FIG. 5. In addition, a display for selecting the range of the print job to be the target of the main printing may not be the position mark 59, and may be, for example, easy-to-understand characters such as "main printing start" and "main printing end" or may be a difference in background color in the management screen 50.

In Step S120, the setting information acquisition unit 12c acquires print setting information necessary for print setting for each of the print jobs registered in the print waiting list 55 at the time when the print button 53 is pressed. Examples of the print setting information include information of the number of print copies, information of an amount of margin to be secured in the medium 30, information of color setting such as color or monochrome, information of a type of a medium, information of a print order of a print job, information indicating the presence or absence of printing for "post-processing," and the information indicating the presence or absence of printing of a header and/or a footer of a print job. The post-processing is processing performed by a post-processing machine on the medium 30 on which the print job has been printed, and examples of the post-processing include die-cutting of a label of label paper, cutting for a cutting line (slit) in the medium 30, and lamination of the medium 30. Details of the post-processing will be described below.

In the present embodiment, an acquisition source of "specific setting information" that causes a difference in the amount of consumption of the medium 30 between the printing in the first print mode, that is, the test printing, and the printing in the second print mode, that is, the main printing, in the print setting information is different between the print job in which the first print mode is designated and the print job in which the second print mode is designated. In the above-described print setting information, for example, the information of the number of print copies, the information of the margin amount, the information indicating the presence or absence of printing for post-processing, and the information indicating the presence or absence of printing of the header and/or the footer of the print job correspond to the specific setting information.

FIG. 6 illustrates a combination of an acquisition source of specific setting information for a print job in which the first print mode is designated and an acquisition source of specific setting information for a print job in which the second print mode is designated in a table format. According to FIG. 6, there are five combinations indicated by combination numbers 1 to 5. In the present embodiment, any of the combination numbers 1 to 5 may be employed.

First Embodiment

According to the first embodiment employing the combination number 1, the setting information acquisition unit 12c acquires the specific setting information for the print job in which the first print mode is designated from "initial setting information," and acquires the specific setting information for the print job in which the second print mode is designated from the accompanied setting information of the print job. The initial setting information includes specific setting information for test printing, and is stored in advance in the storage unit 15 separately from the print job and the like. Since the test printing is a print for checking the quality of the print result before the main printing, the number of print copies per print job may be basically one. Therefore, in the initial setting information, the number of print copies is set to 1. Referring to the example of FIG. 2, printing of one copy means printing on one frame 31. Therefore, when two or more print copies of the print job are printed, the same printing is repeated for two or more frames 31.

From the viewpoint of cost reduction, it is preferable to curb the consumption of the medium 30 as much as possible in the test printing. Therefore, "no margin" is set in the initial setting information. The margin described here is a margin in the transport direction D2 between an image of a print job and an image of another print job, and even though there is no margin, it does not mean that there is a perfect zero margin. When two print jobs are subjected to the test printing, a minimum margin as an initial value is secured between images of the two print jobs so that the images of the two print jobs are not coupled to each other on the medium 30, and "no margin" means that no extra margin exceeding the initial value is provided.

In the test printing, the post-processing is not required, and printing of a header and a footer of a print job is not required in many cases. Therefore, according to the initial setting information, it is directly or indirectly instructed not to perform the printing for post-processing or not to perform the printing of the header and the footer of the print job. The fact that there is no margin, no printing for post-processing, or no printing of the header or footer of the print job may be eventually known from the initial setting information. Therefore, in the initial setting information, it does not matter in what mode an instruction or a suggestion is made that there is no margin, no printing for post-processing, or no printing of the header or the footer of the print job. For example, in the initial setting information, when there is no information of the margin, no information of the post-processing, or no information of the header or the footer of the print job at all, it may be indicated that there is no printing for the margin, the post-processing, or the header or the footer of the print job. On the other hand, in the test printing, when it is desired to print the information of the margin, the information of the post-processing, or the information of the header and the footer of the print job, an instruction content for printing the information of the margin, the information of the post-processing, and the information of the header and the footer of the print job may be directly described in the initial setting information.

According to the first embodiment, each of the print jobs stored in the storage unit 15 has accompanied setting information, and the specific setting information for main printing of the corresponding print job is described in advance in the accompanied setting information.

FIG. 7 illustrates the accompanied setting information 40 of a certain print job. The specific setting information for main printing is described in the accompanied setting information 40, but print setting information other than the specific setting information may also be included.

According to FIG. 7, a case number is described in the accompanied setting information 40 as a number for managing the print job. Also, a delivery date of the print result of the print job to a delivery destination and a file name of an image file are described in the accompanied setting information 40. The image file is image data included in the print job. Further, in the accompanied setting information 40, a variety of information of the number of print copies, a front margin and a rear margin, primary post-processing, and secondary post-processing corresponding to the specific setting information is described. In the example of FIG. 7, the number of print copies is set to 30 copies, which is the number of copies required for delivery and is larger than one copy of the test printing. The front margin is a margin amount to be secured downstream of an image of a print job, and the rear margin is a margin amount to be secured upstream of the image of the print job.

The primary post-processing is post-processing that is first performed on the printed medium 30, and for example, it is described in the accompanied setting information 40 that the post-processing should be performed in a state in which a blade die aaa is set in a post-processing machine XXX. The secondary post-processing is post-processing to be performed on the printed medium 30 after the primary post-processing, and for example, it is described in the accompanied setting information 40 that the post-processing is performed with the setting of the number of slits=2 using a post-processing machine YYY. Here, XXX means a die-cutting machine for die-cutting labels, and YYY means a slitter. The die-cutting machine is a machine that die-cuts a label of label paper in accordance with a shape of an object, and does not cut a mount. On the other hand, the slitter is a machine for slitting and cutting the medium 30 including the mount. Further, examples of the post-processing machine includes those that have multiple functions such as a function of die-cutting labels and a function of slitting and cutting a label. When the label is die-cut and slit using such a post-processing machine, the post-processing machine to be used, the type of the blade used when the label is die-cut, and the number of slits used when the label is slit and cut are described as information of the primary post-processing. As a result, since the die-cutting and slitting of the label are completed in the primary post-processing, the secondary post-processing is not required and information for the secondary post-processing is not required.

Such information of each of the primary post-processing and the secondary post-processing corresponds to "post-processing setting information." In addition, the post-processing setting information can be said to be information indicating that there is "printing for post-processing." Further, in the present embodiment, the case number, delivery date, and the like of the print job are printed as a header and a footer by the main printing. Therefore, the information such as the case number and the delivery date included in the accompanied setting information 40 can be said to be information indicating that there is "printing of the header and/or the footer of the print job." Both the header and the footer do not have to be printed in the main printing, but only one of them may be printed, or neither of them may be printed.

Second Embodiment

According to a second embodiment employing the combination number 2, the setting information acquisition unit 12c acquires the specific setting information for the print job in which the first print mode is designated from the initial setting information. On the other hand, the specific setting information for the print job in which the second print mode is designated is acquired from a "second setting information file" which is stored in a predetermined folder and is different from any of the initial setting information, the accompanied setting information, and a "first setting information file" to be described below. The initial setting information is as described in the first embodiment.

The second setting information file is stored in, for example, a shared folder included in the storage unit 3 of the information processing device 1. That is, the user can generate a desired second setting information file and store it in the shared folder. The setting information acquisition unit 12c accesses the shared folder of the information processing device 1 via the communication IF 16, refers to the stored second setting information file, and acquires the specific setting information corresponding to the print job in which the main printing is designated from the second setting information file. The shared folder is not limited to the information processing device 1 as an external device, and may be included in the storage unit 15 of the printing apparatus 10. The second setting information file and a first setting information file to be described below are text files or files in a table format. The second setting information file and the first setting information file are files generated in a format such as comma separated value (CSV), for example.

FIG. 8 illustrates the second setting information file 41. The specific setting information for main printing is described in the second setting information file 41, but print setting information other than the specific setting information may also be included. As described above, the accompanied setting information 40 is information necessary for the main printing of one print job corresponding to the accompanied setting information 40. The second setting information file 41 may be generally understood as data in which pieces of accompanied setting information corresponding to a plurality of print jobs are collected. According to the example of FIG. 8, in the second setting information file 41, the specific setting information for main printing is described corresponding to each of the print job AA, the print job BB, the print job FF, and the print job CC. The description of the content of the specific setting information corresponding to one print job in the second setting information file 41 is the same as the description of the content of the accompanied setting information 40, and thus will be omitted.

Third Embodiment

According to a third embodiment employing the combination number 3, the setting information acquisition unit 12c acquires the specific setting information for the print job in which the first print mode is designated from the accompanied setting information, and acquires the specific setting information for the print job in which the second print mode is designated from the second setting information file. The second setting information file is as described in the second embodiment.

In the first embodiment, referring to FIG. 7, the specific setting information for the main printing of the corresponding print job is described in the accompanied setting information of the print job stored in the storage unit 15, but in the third embodiment, the specific setting information for the test printing of the corresponding print job is described in the accompanied setting information of the print job. The specific setting information for the test printing is the same as the initial setting information. In other words, each of the print jobs stored in the storage unit 15 may be accompanied by substantially the same initial setting information. In the third embodiment, the accompanied setting information may not be provided for each of the print jobs, but common (one) accompanied setting information may be provided for each of the print jobs.

Fourth Embodiment

According to a fourth embodiment employing the combination number 4, the setting information acquisition unit 12c acquires the specific setting information for the print job in which the first print mode is designated from the first setting information file which is stored in the predetermined folder and is different from both the initial setting information and the accompanied setting information. On the other hand, the specific setting information for the print job in which the second print mode is designated is acquired from the accompanied setting information of the print job. The description of acquiring the specific setting information for the print job in which the second print mode is designated from the accompanied setting information is the same as that in the first embodiment.

The first setting information file is stored in the above-described shared folder. The setting information acquisition unit 12c accesses the shared folder of the information processing device 1 via the communication IF 16, refers to the stored first setting information file, and acquires the specific setting information for the test printing. When seen from the setting information acquisition unit 12c, the first setting information file is different from the initial setting information in a storage location thereof as an information source, but has the same content as the initial setting information.

Fifth Embodiment

According to a fifth embodiment employing the combination number 5, the setting information acquisition unit 12c acquires the specific setting information for the print job in which the first print mode is designated from the first setting information file as in the fourth embodiment, and acquires the specific setting information for the print job in which the second print mode is designated from the second setting information file as in the second and third embodiments.

In any of the first to fifth embodiments, the setting information acquisition unit 12c may acquire setting information other than the specific setting information in the print setting information necessary for printing of the print job from the same acquisition source as the specific setting information, or may acquire the setting information from a different acquisition source from the specific setting information, for example, by an input of the user.

As described above, the specific setting information for the main printing includes post-processing setting information indicating the setting of the post-processing performed on the medium 30 on which the image based on the image data of the print job has been printed. In the first embodiment or the fourth embodiment, the specific setting information for the main printing is described in the accompanied setting information of the print job, and in any one of the second embodiment, the third embodiment, and the fifth embodiment, the specific setting information for the main printing is described in association with the print job in the second setting information file. Therefore, in the present embodiment, it can be said that the print job is associated with the post-processing setting information.

In Step S130, the print setting unit 12d performs print setting of the print job in which the first print mode is designated in accordance with the print setting information including the specific setting information acquired in Step S120 for the print job in which the first print mode is designated. In the present embodiment, for the first print mode, it is assumed to be described that the number of print copies=1 is set as the specific setting information and there is no margin, no printing for post-processing, and no printing of the header and the footer. Therefore, for a print job in which the test printing is designated, the number of print copies=1 is set, and all of the margin, the printing for post-processing, and the printing of the header and the footer are set to none. In addition, the print setting unit 12d performs print setting of each of the print jobs in which the second print mode is designated in accordance with the specific setting information acquired in Step S120 for each of the print jobs in which the second print mode is designated. That is, for a print job in which the main printing is designated, the number of print copies, the amount of margin, the content of printing for post-processing, and the content of printing of the header and the footer are set according to the specific setting information corresponding to each of the print jobs.

The processing for setting the contents of printing for post-processing includes "post-processing comparison determination processing" for comparing the post-processing setting information between the print jobs in which the main printing is designated and determining whether or not it is necessary to change the setting of the post-processing. According to the result of the post-processing comparison determination processing, the content of printing for the post-processing may be changed, or a part of printing for the post-processing may not be performed. Details of the post-processing comparison determination processing are described below.

The print setting unit 12d performs the print setting for each of the print jobs in accordance with setting information other than the specific setting information in the print setting information necessary for printing of the print job. Further, the image data included in the print job is, needless to say, converted into print data. Since the printing of the print job is processing performed by the printing unit 18, Step S130 can also be referred to as a step of performing print setting for the printing unit 18 based on the print setting information.

In Step S140, the print control unit 12e causes the printing unit 18 to perform printing according to the print setting for each of the print jobs in which the print setting has been made in Step S130. That is, when the print job is a print job in which the first print mode is designated, the printing unit 18 is caused to perform the test printing, and when the print job is a print job in which the second print mode is designated, the printing unit 18 is caused to perform the main printing according to the print setting. Among the print jobs registered in the print waiting list 55, the job accumulation unit 12a deletes the registration of the print job of which printing by Step S140 has been completed from the print waiting list 55 and registers the print job in the print completion list 57. That is, the print job of which printing has been completed is moved from the print waiting list 55 to the print completion list 57. The flowchart illustrated in FIG. 3 ends here.

With respect to the flow of the processing of Steps S110 to S140, an example different from the example described above will be described with reference to FIGS. 9 and 10.

In the embodiment described with reference to FIGS. 9 and 10, the acquisition source of the specific setting information for the print job in which the second print mode is designated is limited to the second setting information file. That is, in the embodiment described with reference to FIGS. 9 and 10, combination numbers 1 and 4 of FIG. 6 are not required. The acquisition source of the specific setting information for the print job in which the first print mode is designated may be any one of the initial setting information, the accompanied setting information, and the first setting information file.

Figure 9:
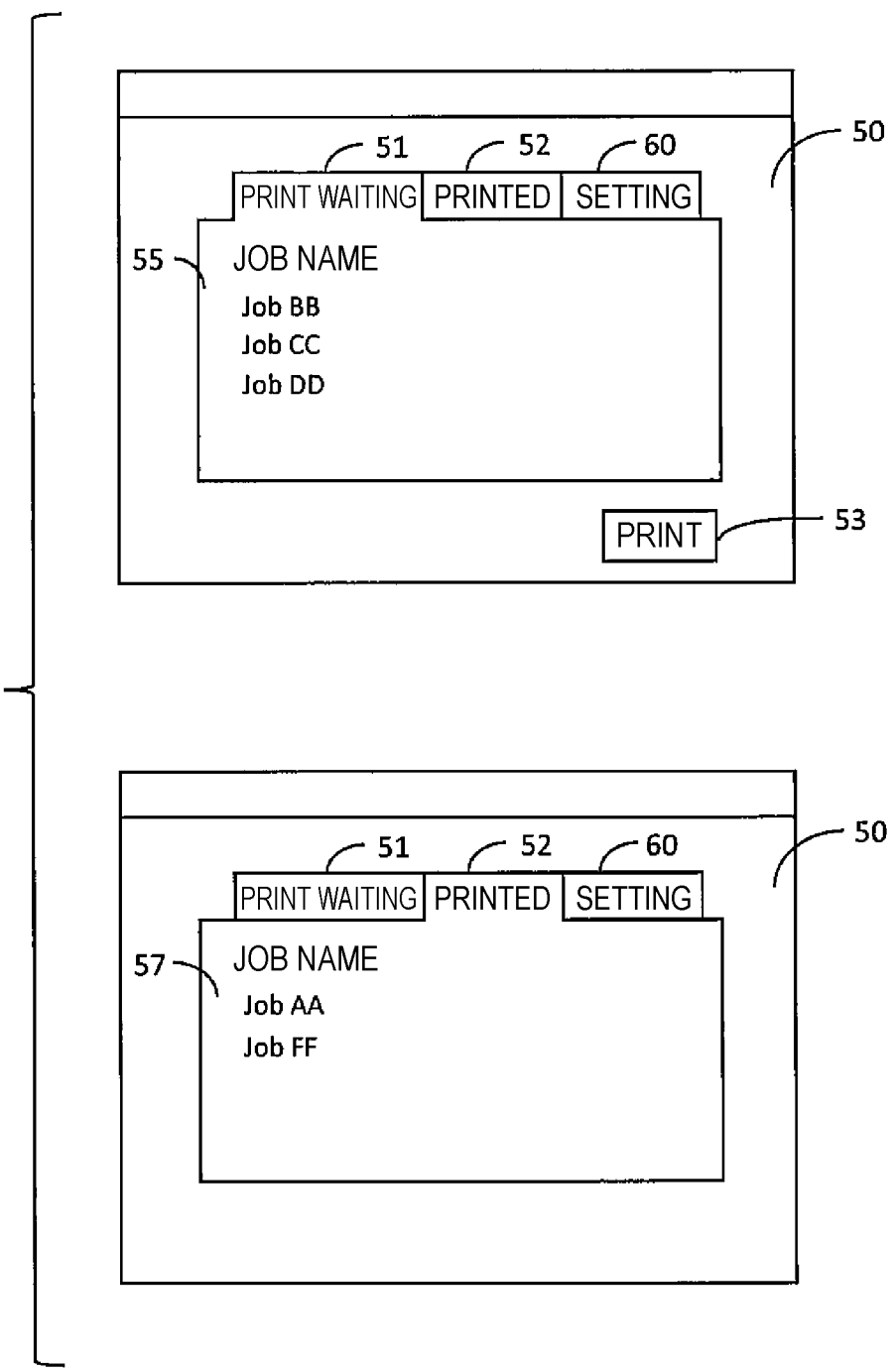
FIG. 9 is a diagram illustrating an example of a management screen having a setting tab.
Figure 10:
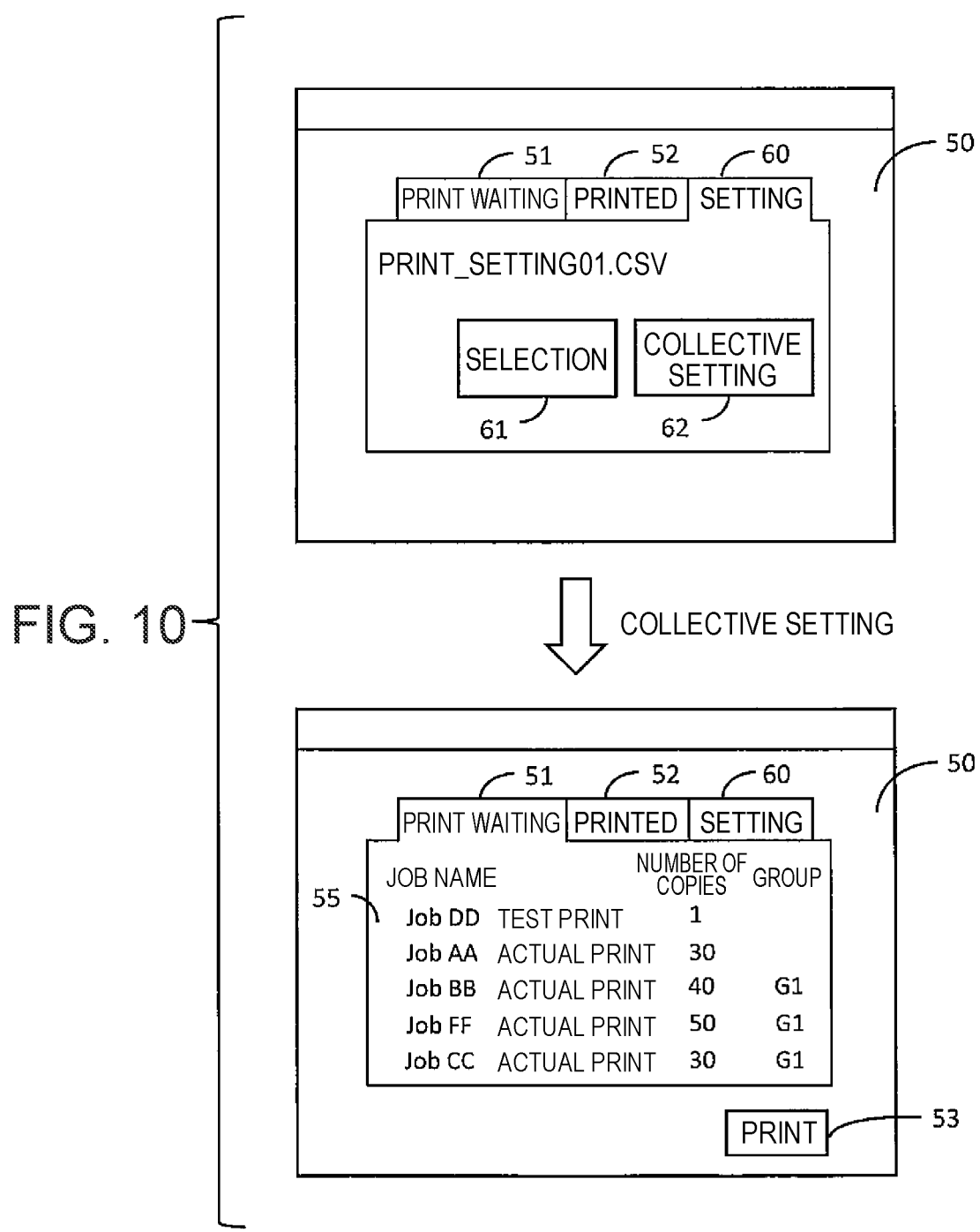
FIG. 10 is a diagram illustrating an example of the management screen having the setting tab.

FIGS. 9 and 10 illustrate a management screen 50 of a print job displayed on the display unit 13 by the control unit 11 and illustrate examples different from those illustrated in FIGS. 4 and 5. According to the examples of FIGS. 9 and 10, the management screen 50 has a setting tab 60 in addition to the print waiting tab 51 and the print completion tab 52. The user can arbitrarily select and operate the setting tab 60.

The print waiting list 55 displayed on the management screen 50 when the user selects the print waiting tab 51 and the print completion list 57 displayed on the management screen 50 when the user selects the print completion tab 52 are illustrated in the upper and lower parts of FIG. 9. According to FIG. 9, the print job BB, the print job CC, and the print job DD are registered in the print waiting list 55, and the print job AA and the print job FF are registered in the print completion list 57. Although not illustrated, also in the management screen 50 illustrated in the lower part of FIG. 9, a print job can be moved from the print completion list 57 to the print waiting list 55 by operating the selection field 58 or the job transfer button 54.

In the upper part of FIG. 10, the setting tab 60 is selected, and as a result, a selection button 61 and a collective setting execution button 62 are displayed on the management screen 50. The user can select the second setting information file by operating the selection button 61. One or more second setting information files are stored in the shared folder. When the selection button 61 is operated, the control unit 11 accesses the shared folder and presents each of the second setting information files stored in the shared folder to the user so as to be visible on the management screen 50. The user performs a predetermined operation of arbitrarily selecting one second setting information file from the presented second setting information files. The setting information acquisition unit 12c acquires the second setting information file selected by the user from the shared folder. As a result, in the upper part of FIG. 10, the second setting information file having a file name "print setting 01" is acquired. Here, it is assumed that the second setting information file having the file name "print setting 01" is the second setting information file 41 illustrated in FIG. 8.

In a state in which the second setting information file 41 is selected as described above, the user touches and operates the collective setting execution button 62. In response to the collective setting execution button 62 is operated, Steps S110 to S130 are automatically performed. The designation reception unit 12b receives designation of the first print mode or the second print mode for the print job accumulated in the storage unit 15 in accordance with the selected second setting information file 41 (Step S110). According to the second setting information file 41, the specific setting information for the main printing is described for the print job AA, the print job BB, the print job FF, and the print job CC. Therefore, as illustrated in FIG. 9, the designation reception unit 12b recognizes that the designation of the second print mode is collectively received for the print job AA, the print job BB, the print job FF, and the print job CC described in the second setting information file 41 among the print job BB, the print job CC, the print job DD, the print job AA, and the print job FF currently registered in the print waiting list 55 or the print completion list 57. The designation reception unit 12b recognizes that the designation of the first print mode has been received for the print job DD registered in the print waiting list 55 but not described in the second setting information file 41.

According to the above description, the collective setting execution button 62 corresponds to a "collective reception button" for collectively receiving designation of the second print mode for a plurality of print jobs. When at least a part of the UI screen such as the management screen 50 and the operation reception unit 14 is regarded as a part of the designation reception unit 12b, it can be said that the designation reception unit 12b of the printing apparatus 10 includes the collective setting execution button 62.

The setting information acquisition unit 12c acquires the specific setting information for the print job DD in which the first print mode is designated as described above, and acquires the specific setting information for the print job AA, the print job BB, the print job FF, and the print job CC in which the second print mode is designated from the second setting information file 41 (Step S120). Step S130 has already been described.

When Steps S110 to S130 are performed in response to the operation of the collective setting execution button 62, the control unit 11 also displays at least a part of the content of the print setting for each of the print jobs in the print waiting list 55 of the management screen 50 as illustrated in the lower part of FIG. 10. Here, due to the operation of the collective setting execution button 62, the print job BB and the print job CC which have been registered in the print waiting list 55 until then and the print job AA and the print job FF which have been registered in the print completion list 57 until then are designated as targets of the second print mode according to the second setting information file 41. Thus, for the print job AA, the print job BB, the print job FF, and the print job CC, the fact that the print job is the main printing, the number of print copies of each of the main printing, and the like are displayed in the print waiting list 55. Further, since the first print mode is designated for the print job DD that has been registered in the print waiting list 55 until then, for the print job DD, the fact that the print job DD is the test printing and the number of print copies=1 are displayed in the print waiting list 55.

Furthermore, as illustrated in the print waiting list 55 in the lower part of FIG. 10, the control unit 11 also displays print order of each of the print jobs in which the second print mode is designated and classification of a "collective print job group" which is a group collected with respect to a certain common denominator in accordance with the second setting information file 41. The print order is determined in advance according to a request of a user or a customer and is defined in the second setting information file 41. That is, description order of the print job AA, the print job BB, the print job FF, and the print job CC in the second setting information file 41 illustrated in FIG. 8 means order when the print job AA, the print job BB, the print job FF, and the print job CC are printed in the main printing. As can be seen from a comparison between FIG. 9 and FIG. 10, the order of the print jobs of the main printing displayed in the print waiting list 55 after the collective setting execution button 62 is operated is irrelevant to the order of the print jobs displayed in the print waiting list 55 and the print completion list 57 before that and follows the description order of the print jobs in the second setting information file 41.

In the second setting information file 41, it is prescribed in advance that the print jobs BB, FF, and CC belong to a group G1 as a classification example of the collective print job group. Therefore, the print waiting list 55 in the lower part of FIG. 10 indicates that the print jobs BB, FF, and CC belong to the group G1. In this way, the control unit 11 sets two or more designated print jobs among the plurality of print jobs stored in the storage unit 15 as a collective print job group.

The collective print job group means a set of print jobs to be continuously subjected to the main printing on a common roll body. This is because, for a plurality of specific print jobs, for example, there are requests such as printing on a common medium type, delivering print results to the same delivery destination, shipping print results to the same destination, and meeting the same delivery date. At least one of an article, a condition, and an element such as the roll body, the medium type, the delivery destination, the destination, and the delivery date is a specific example of the common term described above. Thus, different collective print job groups can be printed on different roll bodies. However, it may be also possible to instruct a different collective print job group to be printed on the same roll body, to stop the printing each time the printing of a different collective print job group is completed, to cut and separate the print result, and then to perform the printing of a next collective print job group. Alternatively, a different collective print job group may be printed on the same roll body, and in the middle of the post-processing, each time the post-processing for the different collective print job group is completed, the print result may be cut and separated, and then the post-processing for a next collective print job group may be performed. Although the collective print job group basically includes two or more print jobs, it is also possible to designate a single print job as one collective print job group for the purpose of printing roll information described below. However, in this case, in a "first printing example" and a "second printing example" which will be described below, it is not regarded as a collective print job group to which post-processing comparison determination processing which will be described below is applied. In other words, in the first printing example and the second printing example, the post-processing comparison determination processing is not performed on a collective print job group including only a single print job.

The user can easily understand the printing of each of the print jobs to be performed by displaying the print waiting list 55 illustrated in FIG. 10 after the operation of the collective setting execution button 62. There is no concept of the collective print job group in the test printing.

When the user operates the print button 53 on the management screen 50 illustrated in the lower part of FIG. 10, the process proceeds to Step S140, and the print control unit 12e causes the printing unit 18 to perform printing according to the print settings in the print order of the print jobs in which the print settings have been made in Step S130. The print control unit 12e performs the test printing on a print job designated as a target of the test printing together with another print job to be main-printed, such as the print job DD illustrated in FIG. 10, before or after the main printing. That is, the print result of the test printing is prevented from entering between the print results of the main printing. In addition, for a print job in which the first print mode is designated, that is, a print job subjected to the test printing, it is preferable that a print result thereof is separated from the roll body every time printing of the print job is completed. In particular, when the test printing is performed before the main printing, it is possible to check or inspect the print result quickly.

The concept of the collective print job group can also be applied to the examples of FIGS. 4 and 5. When the print button 53 is operated on the management screen 50 illustrated in the upper part of FIG. 4 or the management screen 50 illustrated in the upper part of FIG. 5, the print job AA, the print job BB, and the print job CC in which the second print mode is designated at that time may constitute one collective print job group, and the print job DD in which the first print mode is designated may be a target of the test printing.

A design of the management screen 50 in each of the drawings is merely an example. For example, without selecting the tab 51, 52, and 60, the display corresponding to each of the tabs 51, 52, and 60 may be designed to be visually recognized at the same time while changing in the screen. In addition, the buttons 53, 54, 61, and 62 in the management screen 50 are buttons on a touch panel, but at least some of the buttons may be physical buttons.

3. Specific Example of Printing

Next, the present embodiment will be further described with reference to a specific example of a print result obtained by the flowchart of FIG. 3. The printed content of the print result may partially differ according to a position and/or a timing at which the print result is cut. The term "cutting" as used herein refers to an operation of separating the print result into different roll bodies, and does not include an operation of separating the test print from the print result, an operation of cutting the print result with a slitter, and an operation of separating roll information described below from the print result.

3.1 First Printing Example

Figure 11:
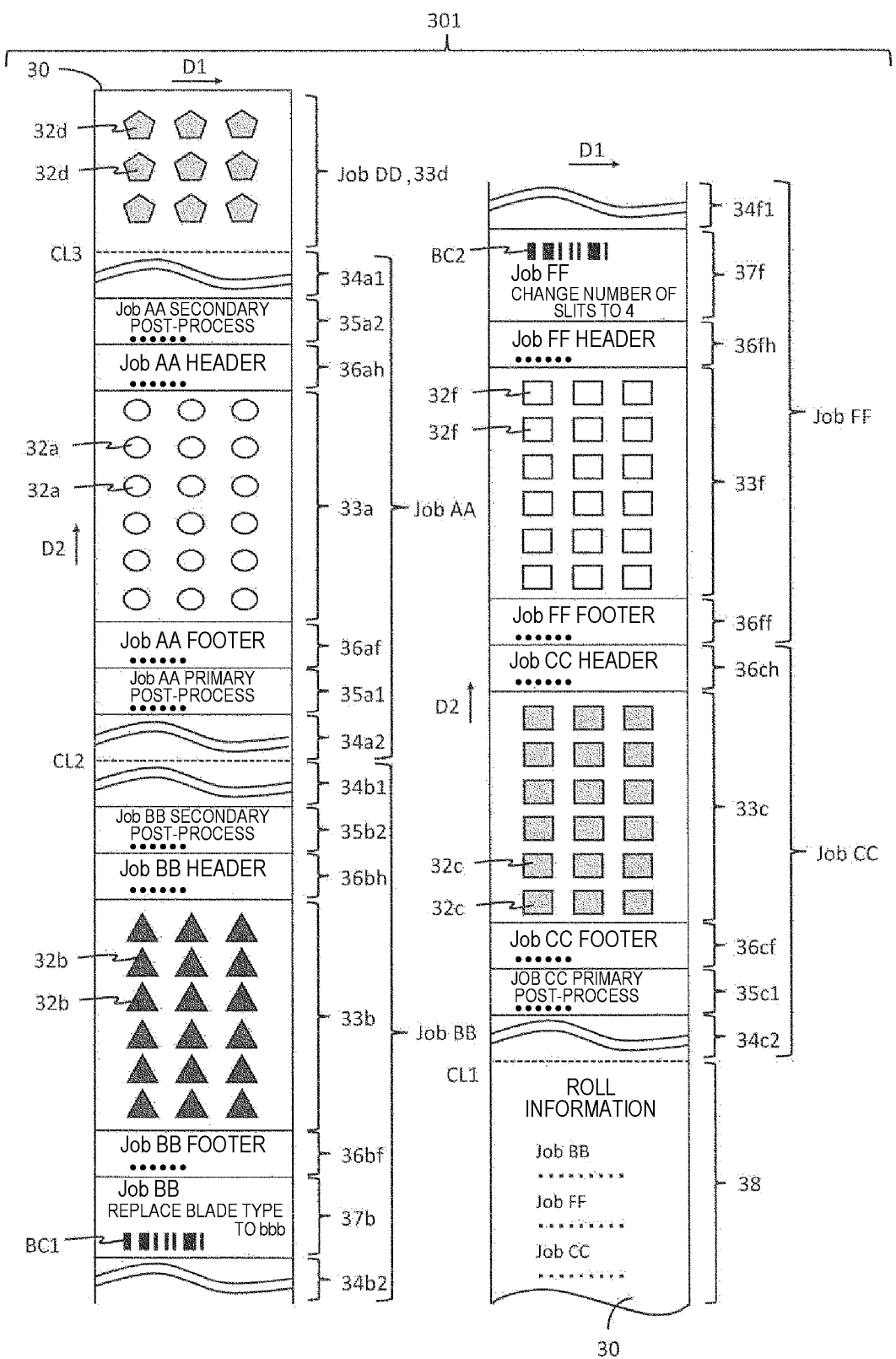
FIG. 11 is a diagram illustrating a print result for explaining a first printing example.

In the first printing example, the print result is cut and separated into the respective roll bodies at a timing when the primary post-processing is performed on the print result and at a boundary between the print jobs. However, the plurality of print jobs designated as the collective print job group are regarded as a set of print job, and the plurality of print jobs included in the collective print job group are separated as one roll body. FIG. 11 illustrates the medium 30 on which printing is performed under the control of the control unit 11. In FIG. 11, the medium 30 is divided into left and right portions due to space limitations, but the medium 30 divided into left and right portions is a continuous long medium 30. In FIG. 11, the medium 30 on the left is a continuous downstream portion and the medium 30 on the right is a continuous upstream portion. The medium 30 illustrated in FIG. 11 is referred to as a print result 301. As an example, it is assumed that the print result 301 is obtained by printing the print job DD, the print job AA, the print job BB, the print job FF, and the print job CC in accordance with the print settings displayed on the management screen 50 in the lower part of FIG. 10.

In the following description of FIGS. 11, 12, and 13A, the management screen 50 in the lower part of FIG. 10 is simply referred to as the management screen 50. According to the management screen 50, the print job DD is first test-printed on the medium 30. The image data of the print job DD represents a set of a plurality of objects 32d for one frame, and an image 33d for one frame is printed on the medium 30 based on the image data of the print job DD. That is, one copy of the image 33d is printed as the test printing. In the description of the print result 301, it is assumed that a set of nine objects in total of 3×3 in length and width corresponds to an image with the number of print copies=1.

According to the management screen 50, subsequent to the test printing of the print job DD, the print job AA, the print job BB, the print job FF, and the print job CC are main-printed in this order. Among them, the print job AA does not form a collective print job group, and the print job BB, the print job FF, and the print job CC form a collective print job group. Cutting lines CL1, CL2, and CL3 indicated by broken lines in the print result 301 are lines for cutting the print result 301 at the above-described timing. Such cutting lines may be printed on the medium 30 together with the print jobs and the like, or may not be actually present. The cutting line CL3 is a boundary between a region corresponding to the print job DD and a region corresponding to the print job AA. The cutting line CL2 is a boundary between a region corresponding to the print job AA and a region corresponding to the print job BB. The cutting line CL1 is a boundary between a region corresponding to the print job CC and a print region of the roll information 38.

Solid lines parallel to a widthwise direction D1 illustrated in the print result 301 are lines that separate the regions of the medium 30 for ease of understanding, but such solid lines may be printed on the medium 30 together with the print job and the like, or may not be actually present.

A symbol 34a1 indicates a front margin 34a1 of the print job AA, and a symbol 34a2 indicates a rear margin 34a2 of the print job AA. The front margin and the rear margin on the medium 30 are, needless to say, regions secured by adjusting an amount of transport of the transport unit 17 in accordance with the specific setting information of the corresponding print job. In FIG. 11, due to space limitations, the front margin 34a1, the rear margin 34a2, and other margins are expressed in a manner that they are shorter than their actual amounts in a transport direction D2.

Secondary post-processing information 35a2 which is post-processing setting information for secondary post-processing of the print job AA is printed on the upstream of the front margin 34a1, and a header 36ah of the print job AA is printed on the upstream of the secondary post-processing information 35a2 of the print job AA. Primary post-processing information 35a1 which is post-processing setting information for primary post-processing of the print job AA is printed on the downstream of the rear margin 34a2, and a footer 36af of the print job AA is printed on the downstream of the primary post-processing information 35a1 of the print job AA. The printing of the secondary post-processing information and the primary post-processing information is printing for post-processing, and the contents thereof are, needless to say, set in accordance with the specific setting information of the corresponding print job. The secondary post-processing information and the primary post-processing information may be abbreviated and simply referred to as post-processing information. In the secondary post-processing information 35a2 and the primary post-processing information 35a1, as described with reference to FIGS. 7 and 8, what kind of post-processing machine should be used and what kind of post-processing should be performed are printed so as to be easily understood. In addition, a code image described below may be printed.

An image 33a corresponding to the print job AA is printed between the header 36ah and the footer 36af. The image data of the print job AA represents a set of the plurality of objects 32a for one frame, and the image 33a corresponding to a plurality of frames is printed based on the image data of the print job AA. According to the management screen 50, since the number of print copies of the main printing of the print job AA is 30, the image 33a is an image corresponding to 30 frames. In FIG. 11, due to space limitations, such an amount of the image of the main printing is expressed to be smaller than an actual amount in the transport direction D2.

As described above, the medium 30 on which printing has been performed by the printing unit 18 is wound in a roll shape by a winding device (not illustrated) on the downstream. Therefore, when the primary post-processing is performed on the medium 30 which becomes the roll body again after the printing, when the medium 30 is fed out from the roll body which is set in the post-processing machine of the primary post-processing, the print result of the print job which is the last in the print order becomes a target of the primary post-processing first. In other words, the print job on the upstream is first subjected to the primary post-processing. In each post-processing, the post-processing is performed while the medium 30 is transported in a direction in which the medium 30 is fed out from the set roll body, and the medium 30 on which the post-processing is completed is wound in a roll shape. Therefore, when the secondary post-processing is performed on the medium 30 that has become a roll body after the primary post-processing, when the medium 30 is fed out from the roll body set in the post-processing machine of the secondary post-processing, the print job on the downstream becomes a target of the secondary post-processing first. In view of such circumstances, as illustrated in FIG. 11, the primary post-processing information corresponding to a certain print job is printed upstream of an image of the print job, and the secondary post-processing information corresponding to the print job is printed downstream of the image of the print job. However, when the roll body after printing wound in a roll shape by a winding device of the printing apparatus 10 is rewound in an opposite winding direction using a rewinding machine prepared separately from the printing apparatus 10 and is then set in the post-processing machine for the primary post-processing, the print job on the downstream is first subjected to the primary post-processing, and the print job on the upstream is first subjected to the secondary post-processing. Therefore, when the rewinding machine is used, the primary post-processing information corresponding to a certain print job is printed downstream of an image of the print job, and the secondary post-processing information corresponding to the print job is printed upstream of the image of the print job.

The front margin 34b1 of the print job BB is secured on the upstream following the rear margin 34a2 of the print job AA, and secondary post-processing information 35b2 which is post-processing setting information for secondary post-processing of the print job BB is printed on the upstream following the front margin 34*b*1 of the print job BB. Further, a header 36*bh* of the print job BB is printed upstream following the secondary post-processing information 35*b*2 of the print job BB. The contents of the header and the footer are, needless to say, set according to the specific setting information of the corresponding print job. As described above, the case number, the delivery date, and the like of the print job are printed as the contents of the header and the footer. Further, at least a part of the post-processing setting information of the corresponding print job may be printed in the header or the footer.

A symbol 34*b*2 indicates a rear margin 34*b*2 of the print job BB. A "setting change instruction" 37*b* for the primary post-processing of the print job BB is printed on the downstream following the rear margin 34*b*2. The setting change instruction is also a kind of printing for post-processing. Originally, at this position, the primary post-processing information which is post-processing setting information for the primary post-processing of the print job BB is printed based on specific setting information for print job BB, but setting change instruction 37*b* is printed in response to the result of the post-processing comparison determination processing. The setting change instruction is the print content set as a result of the post-processing comparison determination processing. Further, the footer 36*bf* of the print job BB is printed on the downstream of the setting change instruction 37*b* of the print job BB.

An image 33*b* corresponding to the print job BB is printed between the header 36*bh* and the footer 36*bf*. The image data of the print job BB represents a set of a plurality of objects 32*b* corresponding to one frame, and the image 33*b* corresponding to a plurality of frames, that is, corresponding to 40 frames in the management screen 50 is printed based on the image data of the print job BB.

A front margin 34*f*1 of the print job FF is secured on the upstream following the rear margin 34*b*2 of the print job BB, and a setting change instruction 37*f* for the secondary post-processing of the print job FF is printed on the upstream following the front margin 34*f*1. At this position, the secondary post-processing information which is the post-processing setting information for the secondary post-processing of the print job FF is originally printed based on the specific setting information for the print job FF, but the setting change instruction 37*f* is printed in response to the result of the post-processing comparison determination processing. Further, the header 36*fh* of the print job FF is printed on the upstream following the setting change instruction 37*f* of the print job FF. An image 33*f* corresponding to the print job FF is printed between the header 36*fh* of the print job FF and the footer 36*ff* of the print job FF. The image data of the print job FF represents a set of a plurality of objects 32*f* for one frame, and the image 33*f* corresponding to a plurality of frames, that is, 50 frames in the management screen 50 is printed based on the image data of the print job FF.

A header 36*ch* of the print job CC is printed on the upstream of the footer 36*ff* of the print job FF. A symbol 34*c*2 indicates a rear margin 34*c*2 of the print job CC, and primary post-processing information 35*c*1 which is post-processing setting information for primary post-processing of the print job CC is printed on the downstream following the rear margin 34*c*2 of the print job CC. A footer 36*cf* of the print job CC is printed on the downstream following the primary post-processing information 35*c*1. An image 33*c* corresponding to the print job CC is printed between the header 36*ch* and the footer 36*cf* of the print job CC. The image data of the print job CC represents a set of a plurality of objects 32*c* for one frame, and the image 33*c* corresponding to a plurality of frames, that is, 30 frames in the management screen 50 is printed based on the image data of the print job CC.

In accordance with the management screen 50, the roll information 38 corresponding to an index of the contents of a group G1 is further printed on the upstream of the print job CC printed last in the group G1 which is the collective print job group, and the printing is completed. That is, the control unit 11 controls the printing unit 18 to print the roll information at the end of the collective print job group. That is, when a plurality of collective print job groups are printed on the same roll body, the roll information is printed at the end of each of the collective print job group. The roll information includes all or at least a part of various pieces of information such as a case number, a delivery date, an image file name, the number of print copies, a margin, and post-processing setting information for each of the print jobs as a target of the collective print job group in the print order of the print jobs or in the reverse order of the print order of the print jobs. The roll information may be the contents of a print job printed on the same roll body. In this case, the roll information is printed only once on the upstream of the last printed print job among all the jobs printed on the same roll body, regardless of whether the collective print job group is designated. When the roll body of the medium 30 wound after printing is set in the post-processing machine, the user can first see the roll information when the medium 30 is pulled out from the roll body.

Next, the post-processing comparison determination processing and the printing of the setting change instruction in the first printing example will be described with reference to the print result 301 of FIG. 11. As described above, the print result 301 printed in the first printing example is cut at the timing of performing the primary post-processing and at the boundary of each of the print jobs, and is separated into each roll body. When the print job included in each of the separated roll bodies is the main printing, the post-processing setting information is printed on the upstream and downstream of the image corresponding to the print job. On the other hand, in the roll body corresponding to the collective print job group including the designated two or more print jobs, the post-processing setting information corresponding to the print job located on the most upstream is printed on the upstream of the image of the print job located on the most upstream of the roll body, and the post-processing setting information corresponding to the print job located on the most downstream is printed on the downstream of the image of the print job located on the most downstream of the roll body. The information printed between the images of the adjacent print jobs in the two or more print jobs included in the collective print job group has different print contents according to the post-processing performed on each of the adjacent print jobs. Therefore, the post-processing comparison determination process is performed on the print jobs included in the collective print job group.

Focusing on the group G1 on the management screen 50, that is, the printing of the collective print job group, the printing unit 18 sequentially prints images on the medium 30 based on the image data of each of the print jobs included in the collective print job group. Here, n is an integer equal to or greater than 1, and an image to be printed on the medium 30 based on image data of an "n-th print job" which is an n-th print target of the printing unit 18 among the print jobs included in the collective print job group is referred to as an "n-th image." Similarly, an image to be printed on the medium 30 based on image data of an "(n+1)-th print job" which is an (n+1)-th print target of the printing unit 18 among the print jobs included in the collective print job group is referred to as an "(n+1)-th image."

According to FIG. 11, when n=1, the print job BB corresponds to an n-th print job, the print job FF corresponds to a (n+1)-th print job, the image 33*b* corresponds to an n-th image, and the image 33*f* corresponds to a (n+1)-th image. Since the image 33*b*, the image 33*f*, and the like that are main-printed are images that include a plurality of objects or correspond to a plurality of print copies, each of them may be referred to as an image group. When n=2, the print job FF corresponds to the n-th print job, the print job CC corresponds to the (n+1)-th print job, the image 33*f* corresponds to the n-th image, and the image 33*c* corresponds to the (n+1)-th image.

In addition, the post-processing setting information associated with the n-th print job is referred to as "n-th post-processing setting information," and the post-processing setting information associated with the (n+1)-th print job is referred to as "(n+1)-th post-processing setting information." When the print job BB is the n-th print job, the post-processing setting information included in the specific setting information acquired in Step S120 for the print job BB in which the second print mode is designated corresponds to the n-th post-processing setting information. Similarly, when the print job FF is the (n+1)-th print job, the post-processing setting information included in the specific setting information acquired in Step S120 for the print job FF in which the second print mode is designated corresponds to the (n+1)-th post-processing setting information. However, in a third printing example to be described below, when the print job is designated by the second print mode, regardless of whether or not the print job belongs to the collective print job group, the print job, the image, and the post-processing setting information appropriately use description indicating the order such as "n" or "n+1" in accordance with the print order by the printing unit 18.

Figure 12:
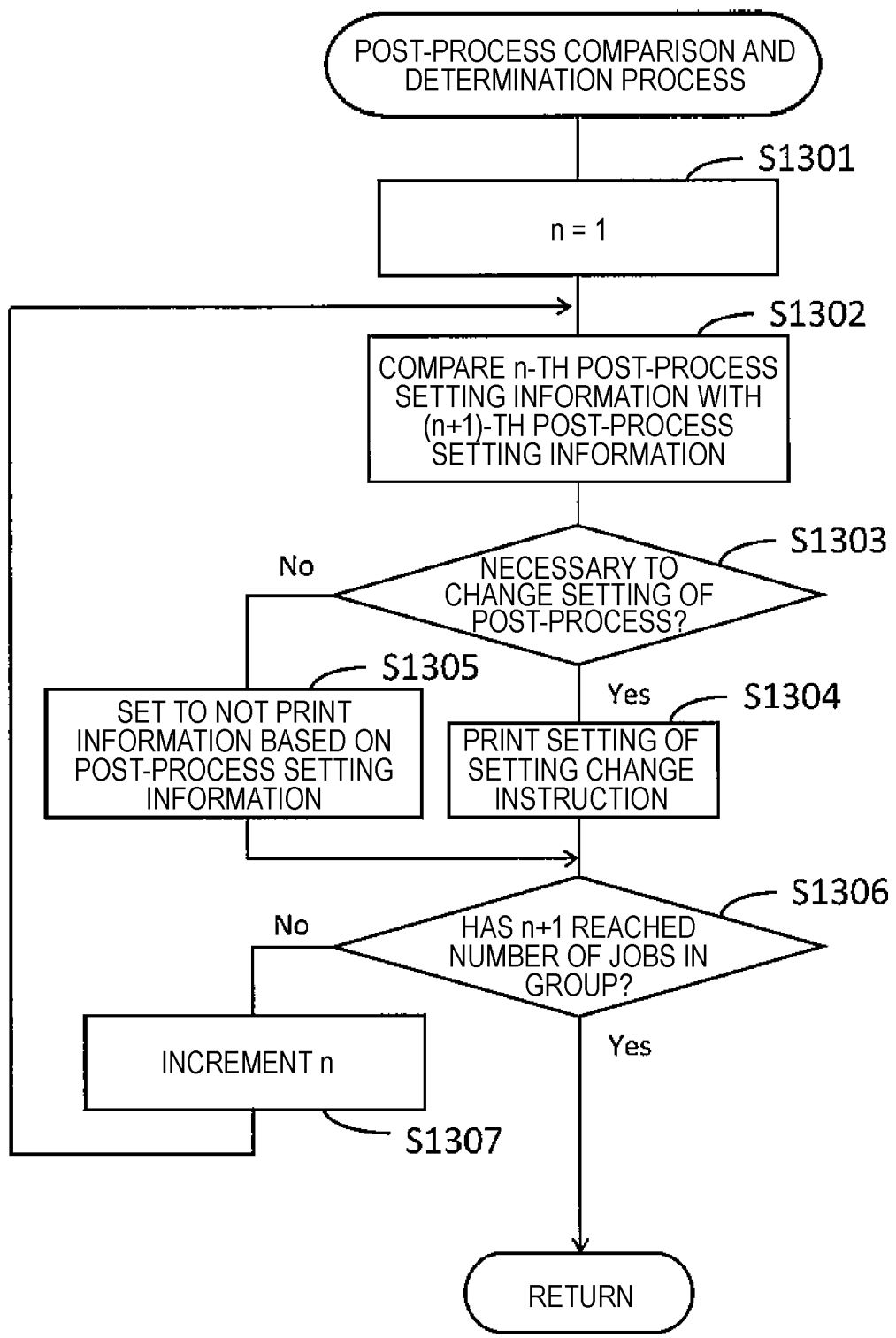
FIG. 12 is a flowchart illustrating post-processing comparison determination processing according to the first printing example.

FIG. 12 is a flowchart illustrating the post-processing comparison determination processing included in Step S130. In Step S1301, the control unit 11 sets n to 1 which is an initial value. In Step S1302, the control unit 11 compares the n-th post-processing setting information with the (n+1)-th post-processing setting information to determine whether or not the setting of the post-processing needs to be changed. When the setting of the post-processing needs to be changed, the process proceeds from the determination of "Yes" in Step S1303 to Step S1304, and the control unit 11 performs setting for causing the printing unit 18 to print the setting change instruction of the post-processing instead of the post-processing information to be originally printed based on the specific setting information of the corresponding print job at a position between the n-th image and the n+1-th image on the medium 30. Then, the process proceeds from Step S1304 to Step S1306. The reason why the setting change instruction of the post-processing is set to be printed instead of the post-processing information to be originally printed when it is determined that the setting of the post-processing needs to be changed is to easily notify the user who performs the post-processing that the post-processing setting needs to be changed between the n-th print job and the (n+1)-th print job.

As a result of the comparison in Step S1302, when the setting of the post-processing does not need to be changed, the control unit 11 proceeds from the determination of "No" in Step S1303 to Step S1305. In Step S1305, the control unit 11 changes the print setting so that the post-processing information originally set to be printed based on the specific setting information of the corresponding print job is not printed. This means that no information based on the post-processing setting information is printed at a position between the n-th image and the (n+1)-th image on the medium 30. The information based on the post-processing setting information includes primary post-processing information, secondary post-processing information, and a setting change instruction. The reason why the setting is changed so that the originally set post-processing information is not printed when it is determined that the setting of the post-processing does not need to be changed is that the consumption of the medium 30 and ink can be curbed by omitting the printing for the post-processing, and the user who performs the post-processing can easily know that the setting of the post-processing does not need to be changed between the n-th print job and the (n+1)-th print job. After Step S1305 is performed, the control unit 11 proceeds to Step S1306.

In Step S1306, the control unit 11 determines whether or not n+1 has reached the number of print jobs in the collective print job group. According to the management screen 50, the group G1 includes three print jobs such as a print job BB, a print job FF, and a print job CC. Therefore, when n=2 at the time of Step S1306, since n+1=3, "Yes" is determined, and the flowchart of FIG. 12 is ended. When n+1 has not reached the number of print jobs in the collective print job group, the control unit 11 proceeds from the determination of "No" in Step S1306 to Step S1307, increases n, that is, increases the numerical value of n by one, and proceeds to Step S1302.

In FIG. 13A, the post-processing setting information of each of the print job BB, the print job FF, and the print job CC forming the group G1 is illustrated by Table 42 for easy comparison. Here, it is assumed that the primary post-processing is die-cutting of the label, and the secondary post-processing is cutting of the medium 30 after the die-cutting of the label. According to Table 42, in all of the print job BB, the print job FF, and the print job CC, it is set that the post-processing machine XXX is used for die-cutting of the label and the post-processing machine YYY is used for cutting of the medium 30. Further, according to Table 42, it is set that label cutting is performed using the blade die bbb for the print job BB, and die-cutting of the label is performed using the blade die aaa for the print job FF and the print job CC. In addition, it is set that cutting of the medium 30 is performed with the number of slits=2 for the print job BB, and cutting of the medium 30 is performed with the number of slits=4 for the print job FF and the print job CC.

Referring to Table 42, the post-processing setting information is different between the print job BB and the print job FF. Therefore, in the flowchart of FIG. 12, the control unit 11 performs the setting for printing the setting change instruction at the position between the image 33*b* corresponding to the print job BB and the image 33*f* corresponding to the print job FF on the medium 30 in Step S1304. On the other hand, according to Table 42, the print job FF and the print job CC have the same post-processing setting information. Therefore, in the flowchart of FIG. 12, the control unit 11 changes the setting at Step S1305 so that the post-processing information originally set to be printed at a position between the image 33*f* corresponding to the print job FF and the image 33*c* corresponding to the print job CC on the medium 30, is not printed.

More specifically, since the primary post-processing is performed in the order of a region of the image 33*f* and a region of the image 33b on the medium 30, the control unit 11 determines that it is necessary to change the setting of the primary post-processing for the region of the image 33b on the medium 30. Since the secondary post-processing is performed in the order of a region of the image 33b and a region of the image 33f on the medium 30, the control unit 11 determines that it is necessary to change the setting of the secondary post-processing for the region of the image 33f on the medium 30.

When the control unit 11 determines that it is necessary to change the setting of the primary post-processing for the region of the image 33b in this way, the control unit 11 causes the printing unit 18 to print a "first change instruction" which is a setting change instruction of the primary post-processing at a position between the image 33b and the image 33f on the medium 30 in Step S140 via Step S1304. In FIG. 11, a setting change instruction 37b for instructing to replace the blade die corresponds to the first change instruction. Further, when the control unit 11 determines that it is necessary to change the setting of the secondary post-processing for the region of image 33f as described above, the control unit 11 causes the printing unit 18 to print a "second change instruction" which is a setting change instruction of the secondary post-processing at a position between the image 33b and the image 33f on the medium 30 in Step S140 through Step S1304. In FIG. 11, a setting change instruction 37f for instructing to change the number of slits corresponds to the second change instruction. The setting change instruction 37b and the setting change instruction 37f may be information indicating only a setting to be changed or information indicating both a setting to be changed and a setting not to be changed.

When such a print result 301 is output, the user can proceed with the post-processing as follows.

First, the user pulls out the medium 30 from the print result 301 as a roll body, cuts the medium 30 at a position of the cutting line CL1, and separates the region in which the roll information 38 is printed from the roll body. Then, the user confirms the primary post-processing information 35c1 printed on the roll body, sets the roll body in the post-processing machine XXX for the primary post-processing, performs necessary setting such as mounting the blade die aaa in the post-processing machine XXX, and causes the post-processing machine XXX to start the primary post-processing.

By the post-processing machine XXX, die-cutting of the label with the region of the image 33c as a target is performed, and then die-cutting of the label with the region of the image 33f as a target is performed. As can be understood from the above description, since there is no difference between the post-processing setting information of the print job CC and the post-processing setting information of the print job FF, printing for the post-processing including a setting change instruction is not performed between the image 33f and the image 33c. In this manner, when there is no change in the setting of the post-processing between the n-th print job and the (n+1)-th print job, it is possible to curb the consumption of the medium 30 or ink by omitting printing for the post-processing. A margin is not particularly secured between the image 33f and the image 33c. That is, even if the specific setting information for the main printing of the print job CC describes that the front margin is set, the setting is changed so as not to secure the front margin, and even if the specific setting information for the main printing of the print job FF describes that the rear margin is set, the setting is changed so as not to secure the rear margin, and no margin is secured between the image 33f and the image 33c. This is performed by the control unit 11 at Step S1305 together with the setting change in which the post-processing information is not printed. Even after die-cutting of the label for the region of the image 33f by the post-processing machine XXX is ended, the medium 30 is continuously transported by the post-processing machine XXX. The user checks the setting change instruction 37b and temporarily stops the transport of the medium 30 by the post-processing machine XXX before the region of the image 33b becomes a target of die-cutting of the label by the post-processing machine XXX. Then, according to the setting change instruction 37b, the current blade die aaa is replaced with the blade die bbb, and the transport of the medium 30 by the post-processing machine XXX is resumed.

However, the transport of the post-processing machine may be temporarily stopped automatically. According to FIG. 11, the setting change instruction 37b includes a code image BC1 in addition to characters recognizable by the user. The code image BC1 is, for example, a bar code or a two dimensional code, and includes, as information, an instruction to temporarily stop transport during the primary post-processing. Therefore, when the post-processing machine XXX for the primary post-processing has a camera capable of reading the code image and a code analysis function, the post-processing machine XXX can temporarily stop the transport when the code image BC1 is read from the medium 30 being transported after the label is die-cut in the region of the image 33f.

That is, in Step S140, the control unit 11 may cause the printing unit 18 to print the setting change instruction and the instruction to stop the transport of the medium 30 at a position between the n-th image and the (n+1)-th image on the medium 30. At least one of the setting change instruction and the instruction to stop the transport of the medium 30 may be printed at a position between the n-th image and the (n+1)-th image on the medium 30. When only the setting change instruction is printed, the user confirms the setting change instruction and temporarily stops the transport of the medium 30 by the post-processing machine before the region of the n-th image or the (n+1)-th image becomes the target of the post-processing by the post-processing machine. On the other hand, when only the instruction to stop the transport of the medium 30 is printed, the stop instruction means that the setting of the post-processing is changed between the n-th image and the (n+1)-th image. Therefore, after the user or the post-processing machine stops the transport of the medium 30 based on the instruction to stop the transport of the medium 30, the user compares the information of the header corresponding to the (n+1)-th image with the information of the footer corresponding to the n-th image, or confirms the information of the cut roll information 38, and changes the setting of the post-processing.

The code image BC1 may include information other than the instruction to stop the transport, and may include an instruction to change the setting of the post-processing as information. For example, the post-processing machine XXX temporarily stops the transport of the medium 30 by reading the code image BC1 and notifies and urges the user to replace the blade die aaa with the blade die bbb in accordance with the setting change instruction. Alternatively, the post-processing machine XXX may temporarily stop the transport of the medium 30 by reading the code image BC1 and automatically replace the blade die aaa with the blade die bbb in accordance with the setting change instruction.

That is, in Step S140, the control unit 11 can cause the printing unit 18 to print the setting change instruction by any one of a character, a code image, and a combination of a character and a code image. After the blade die is replaced, the post-processing machine XXX resumes the transport of the medium 30 in response to an instruction from the user or automatically and performs die-cutting of the label in the region of the image 33b.

When the die-cutting of the label for the region of the image 33b by the post-processing machine XXX is completed, the user cuts the medium 30 at a position of the cutting line CL2 and separates the regions of the medium 30 corresponding to the print job BB, the print job FF, and the print job CC from the print result 301 as the roll body. The regions of the medium 30 corresponding to the print job BB, the print job FF, and the print job CC, that is, the region from the cutting line CL1 to the cutting line CL2, which are cut off in this manner, are wound in a roll shape by the winding device of the post-processing machine XXX, and become a roll body (hereinafter, a group job roll body).

Subsequently, the user confirms the primary post-processing information 35a1 printed on the medium 30 continuously fed out from the roll body set in the post-processing machine XXX, performs necessary settings such as a blade die according to the primary post-processing information 35a1, and causes the post-processing machine XXX to start the primary post-processing for the region of the image 33a. In addition, when a code image is printed on the primary post-processing information 35a1, when the code image is read from the medium 30 being transported using a camera capable of reading the code image or a code analysis function provided in the post-processing machine XXX for the primary post-processing, the post-processing machine XXX can automatically temporarily stop the transport after die-cutting of the label for the region of the image 33a is completed. Of course, when the primary post-processing information 35a1 indicates a die-cutting machine other than the post-processing machine XXX, the user sets the print result 301 from which the group job roll body has been cut off to the die-cutting machine indicated by the primary post-processing information 35a1 and starts the primary post-processing for the region of the image 33a. When die-cutting of the label for the region of the image 33a by any one of the die-cutting machines is completed, the user cuts the medium 30 at a position of the cutting line CL3 and separates the region of the medium 30 corresponding to the print job AA from the print result 301. The separated region of the medium 30 corresponding to the print job AA, that is, the region between the cutting line CL2 and the cutting line CL3 is also wound into a roll shape to form a roll body (hereinafter, referred to as a single job roll body).

The user confirms the secondary post-processing information 35b2 printed on the group job roll body and sets the group job roll body in the post-processing machine YYY for the secondary post-processing. At this time, the user makes necessary settings such as setting the number of slits to 2 in accordance with the secondary post-processing information 35b2 and causes the post-processing machine YYY to start the secondary post-processing. The post-processing machine YYY cuts out the medium 30 for the region of the image 33b. Thereafter, the medium 30 is continuously transported by the post-processing machine YYY. The user checks the setting change instruction 37f and temporarily stops the transport of the medium 30 by the post-processing machine YYY before the region of the image 33f becomes a cutting target of by the post-processing machine YYY. Then, according to the setting change instruction 37f, the number of slits is changed from the current 2 to 4.

Similarly to the case in which the code image BC1 is included in the setting change instruction 37b, the code image BC2 may be included in the setting change instruction 37f. The code image BC2 includes, as information, an instruction to temporarily stop the transport at the time of the secondary post-processing or an instruction to change the setting of the post-processing. Since a method of using the code image BC2 is the same as the method of using the code image BC1, description thereof will be omitted. After the number of slits is changed, the post-processing machine YYY resumes the transport of the medium 30 in response to a user's instruction or automatically, and cuts the medium 30 for the region of the image 33f. Subsequently, the post-processing machine YYY performs cutting for the region of the image 33c. Thus, the secondary post-processing for the group job roll body is completed.

Of course, the user makes necessary settings for the post-processing machine necessary for the secondary post-processing of the single job roll body in accordance with the secondary post-processing information 35a2 printed on the single job roll body. Then, the post-processing machine in which the single job roll body is set is caused to perform the secondary post-processing on the region of the image 33a corresponding to the print job AA.

Specific examples of the primary post-processing and the secondary post-processing that can be performed on the medium 30 after printing are not limited to those described above. Further, the post-processing on the medium 30 after printing may be only the primary post-processing. When the post-processing is only the primary post-processing, the control unit 11 does not need to cause the printing unit 18 to perform printing for the secondary post-processing.

3.2 Second Printing Example

The second printing example is different from the first printing example in a method of separating the collective print job group into the roll body. In the first printing example, the collective print job group is separated into one roll body, but in the second printing example, the form of separation into a roll body differs according to the post-processing performed on each of the adjacent print jobs in the two or more print jobs included in the collective print job group.

Figure 16:
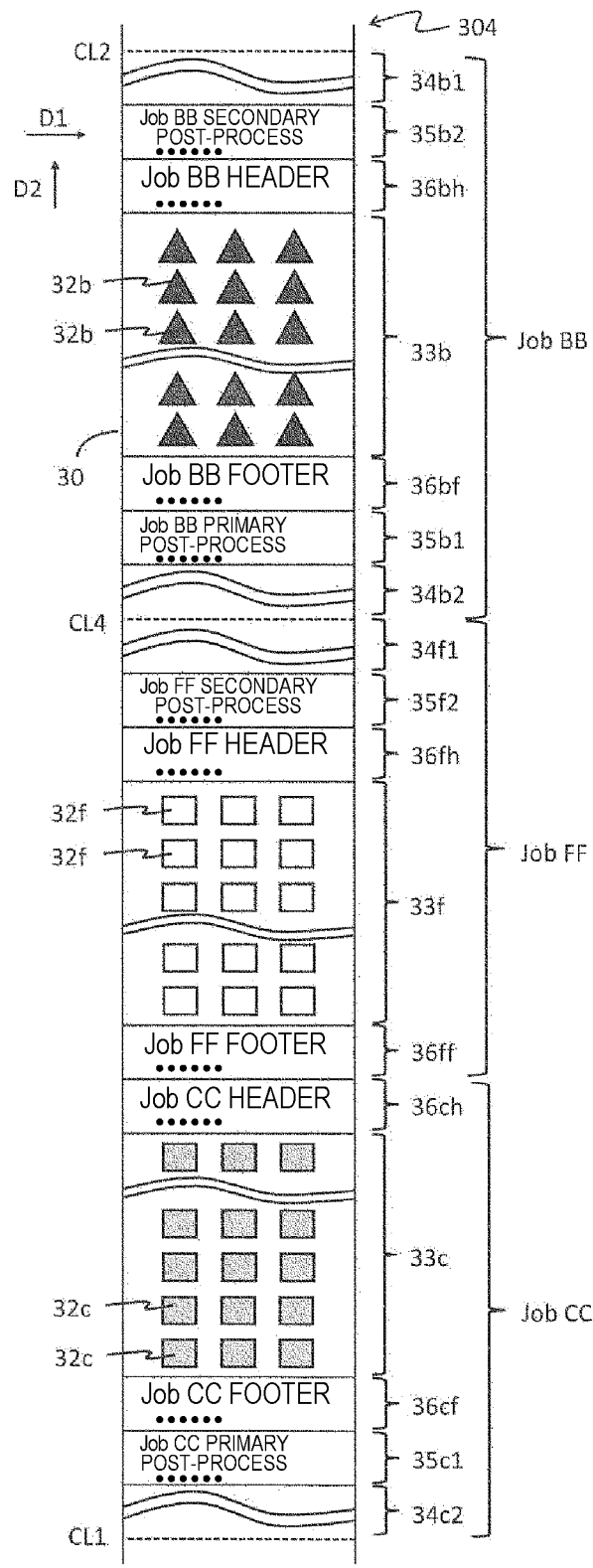
FIG. 16 is a diagram illustrating a print result for describing a second printing example.

FIG. 16 illustrates a region corresponding to a range from the cutting line CL1 to the cutting line CL2 in the print result 301 illustrated in FIG. 11 in order to describe the second printing example. The print result illustrated in FIG. 16 is referred to as a print result 304. The print result 304 is the same as the print result 301 of FIG. 11 except for a region illustrated in FIG. 16. FIG. 16 is different from FIG. 11 in that primary post-processing information 35b1, which is the post-processing setting information for the primary post-processing of the print job BB, is printed between the footer 36bf of the print job BB and the rear margin 34b2 of the print job BB. The secondary post-processing information 35f2, which is the post-processing setting information for the secondary post-processing of the print job FF, is printed between the front margin 34f1 of the print job FF and the header 36fh of the print job FF. Further, a cutting line CL4 is set between the rear margin 34b2 of the print job BB and the front margin 34f1 of the print job FF.

The post-processing comparison determination processing in the second printing example will be described with reference to the print result 304 in FIG. 16. As described above, the print result 304 printed in the second printing example is different from that in the first printing example in a separation method for the collective print job group into a roll body. Specifically, when the settings of the post-processing performed on each of the adjacent print jobs in the collective print job group are the same, the adjacent print jobs are wound around the same roll body, and when the settings of the post-processing are different, the print result is cut at a position between the adjacent images of the adjacent print jobs, and the adjacent print jobs are separated into separate roll bodies. Therefore, as in the first printing example, the post-processing comparison determination processing is performed on the print jobs included in the collective print job group.

Figure 17:
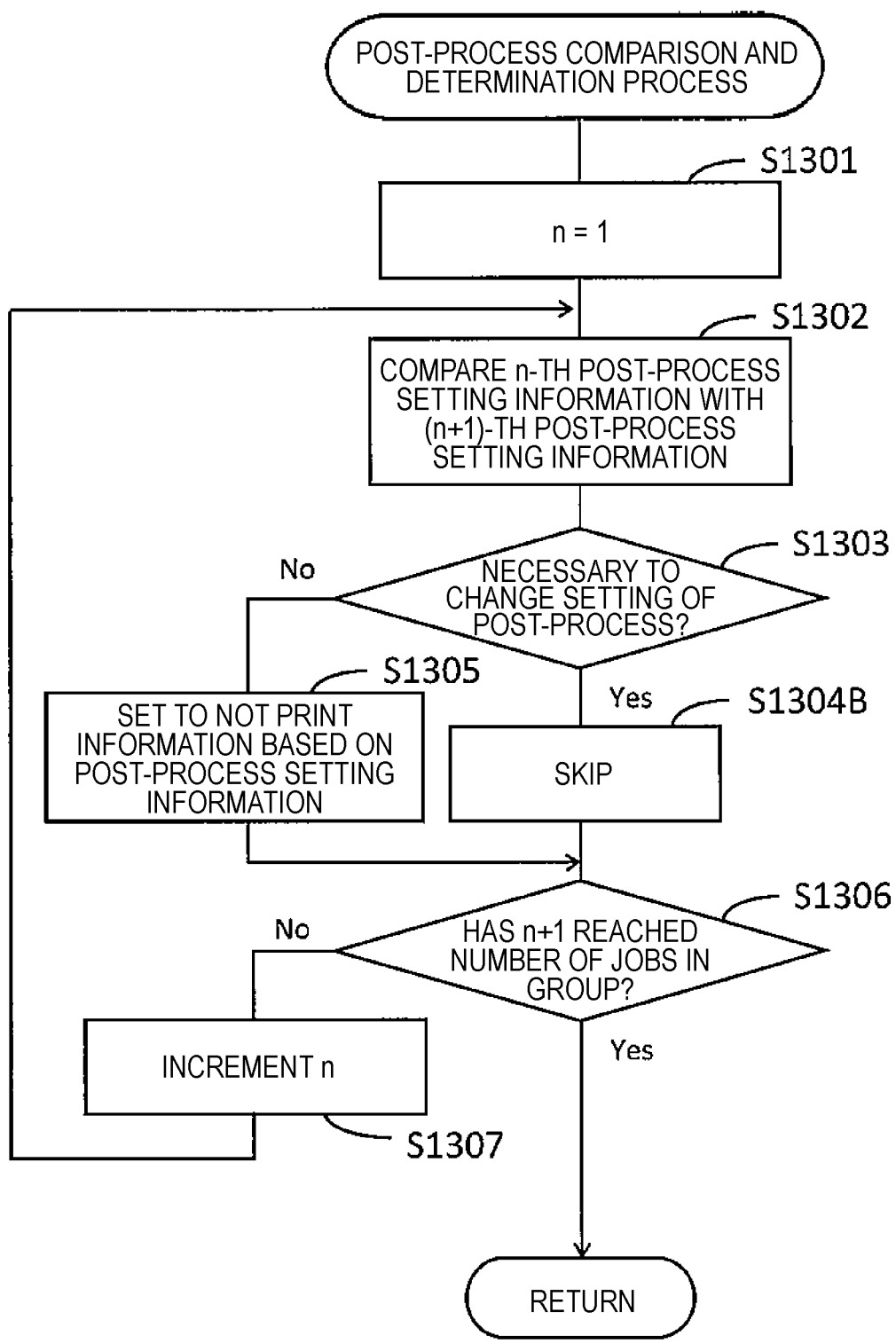
FIG. 17 is a flowchart illustrating post-processing comparison determination processing according to the second printing example.

FIG. 17 is a flowchart illustrating the post-processing comparison determination processing included in Step S130. FIG. 17 differs from the post-processing comparison determination processing of the first printing example illustrated in FIG. 12 in that there is no Step S1304. That is, in the first printing example, the print setting of the setting change instruction is performed in Step S1304, whereas in the second printing example, after "Yes" in Step S1303, the process proceeds to Step S1306 without performing Step S1304. Step S1304B in FIG. 17 indicates that Step S1304 is not substantially performed, that is, S1304 is skipped. In the second printing example, it is determined whether or not it is necessary to change the setting of the post-processing by comparing the n-th post-processing setting information with the (n+1)-th post-processing setting information, and when it is determined that it is necessary to change the setting of the post-processing, the print result is cut at a position between the n-th print job and the (n+1)-th print job and is separated into different roll bodies. For this reason, a cutting position, that is, a position between the n-th print job and the (n+1)-th print job comes to the head in the primary post-processing or the secondary post-processing when the separated roll body is set in the post-processing machine. Therefore, it is preferable to print the post-processing setting information rather than print the setting change instruction as in the first printing example. Since the post-processing information such as the primary post-processing information and the secondary post-processing information is originally set to be printed at this position based on the specific setting information corresponding to the print job, the print setting is not changed to print the setting change instruction in Step S1304.

Referring to Table 42, the post-processing setting information is different between the print job BB and the print job FF. Therefore, in the second printing example, the control unit 11 has a setting to cut the print result at a position between the image 33$b$ corresponding to the print job BB and the image 33$f$ corresponding to the print job FF on the medium 30. Therefore, since the corresponding post-processing information is printed at a position between the image 33$b$ corresponding to the print job BB and the image 33$f$ corresponding to the print job FF, Step S1304 is not performed, and the print setting of the original post-processing information is utilized as it is. On the other hand, according to Table 42, the print job FF and the print job CC have the same post-processing setting information. Therefore, in the flowchart of FIG. 17, the control unit 11 changes the print setting so that the post-processing information is not printed at a position between the image 33$f$ corresponding to the print job FF and the image 33$c$ corresponding to the print job CC on the medium 30 (S1305).

When the control unit 11 determines that it is necessary to change the setting of the primary post-processing for the region of image 33$b$ in this way, in Step S140, the control unit 11 causes the printing unit 18 to the print primary post-processing information 35$b$1, which is the post-processing setting information for the primary post-processing, at a position between image 33$b$ and image 33$f$ on the medium 30. Further, when it is determined that the setting of the secondary post-processing for the region of the image 33$f$ needs to be changed as described above, the control unit 11 causes the printing unit 18 to print the secondary post-processing information 35$f$2, which is the post-processing setting information for the secondary post-processing, at a position between the image 33$b$ and the image 33$f$ on the medium 30 in Step S140.

When such a print result 304 is output, the user can proceed with the post-processing as follows. First, the user pulls out the medium 30 from the print result 304 as a roll body, cuts the medium 30 at the position of the cutting line CL1, and separates the region in which the roll information 38 is printed from the roll body. Then, the user confirms the primary post-processing information 35$c$1 printed on the roll body, sets the roll body in the post-processing machine XXX for the primary post-processing, performs necessary setting such as mounting the blade die aaa in the post-processing machine XXX, and causes the post-processing machine XXX to start the primary post-processing.

By the post-processing machine XXX, die-cutting of the label for the region of the image 33$c$ is performed, and then die-cutting of the label for the region of the image 33$f$ is performed. Although the medium 30 is continuously transported by the post-processing machine XXX even after die-cutting of the label for the region of the image 33$f$ by the post-processing machine XXX is ended, the user confirms the primary post-processing information 35$b$1 and temporarily stops the transport of the medium 30 by the post-processing machine XXX before the region of the image 33$b$ becomes the target of the die-cutting of the label by the post-processing machine XXX. Then, the medium 30 is cut at the position of the cutting line CL4, and the regions of the medium 30 corresponding to the print job FF and the print job CC are separated from the print result 304 as the roll body. The region of the medium 30 corresponding to the print job FF and the print job CC which are separated in this way, that is, the region from the cutting line CL1 to the cutting line CL4 is wound in a roll shape by the winding device of the post-processing machine XXX and becomes a roll body (hereinafter, a first roll body). Further, the user confirms the secondary post-processing information 35C printed on the first roll body and sets the first roll body in the post-processing machine YYY for the secondary post-processing. At this time, the user makes necessary settings such as setting the number of slits to 4 in accordance with the secondary post-processing information 35C, and causes the post-processing machine YYY to start the secondary post-processing. The post-processing machine YYY performs the cutting of the medium 30 for the regions of the image 33$f$ and the image 33$c$. Thus, the secondary post-processing for the first roll body is completed.

On the other hand, in the post-processing machine XXX, the primary post-processing information 35$b$1 of the print job BB is confirmed, the current blade die aaa is replaced with the blade die bbb, and the transport of the medium 30 by the post-processing machine XXX is resumed. However, the transport of the post-processing machine may be temporarily stopped automatically. When the post-processing machine XXX for the primary post-processing has a camera capable of reading a code image or a code analysis function, and the primary post-processing information 35$b$1 of the print job BB includes a code image in addition to characters recognizable by the user, the post-processing machine XXX may temporarily stop the transport when the code image is read from the medium 30 being transported after the die-cutting of the label in the region of the image 33f is ended. In addition, when the code image as the primary post-processing information 35b1 is not printed, the control unit 11 may perform print setting so that the code image for temporarily stopping the transport of the medium 30 is printed in the primary post-processing information 35b1 in Step S1304B. A printing position of the code image for temporarily stopping the transport of the medium 30 is not limited to the position of the primary post-processing information 35b1 as long as it is a position at which the transport of the medium 30 by the post-processing machine XXX can be temporarily stopped before the region of the image 33b of the print job BB becomes a target of die-cutting of the label by the post-processing machine XXX. More preferably, the printing position of the code image for temporarily stopping the transport of the medium 30 is a position at which the transport of the medium 30 by the post-processing machine XXX can be temporarily stopped before the region of the header 36fh of the print job FF becomes a target of die-cutting of the label by the post-processing machine XXX.

Further, in Step S1304B, the print setting for changing a color of characters, a font of characters, or a size of characters may be performed with respect to the information different between the n-th print job and the (n+1)-th print job in the (n+1)-th post-processing setting information corresponding to the (n+1)-th print job. In this way, when the medium 30 is cut between the n-th image of the n-th print job and the (n+1)-th image of the (n+1)-th print job, and the setting of the post-processing for the (n+1)-th image of the (n+1)-th print job left on the roll body is set for the corresponding post-processing machine, which setting should be changed can be easily read from the post-processing information printed on the medium 30.

When die-cutting of the label for the region of the image 33b by the post-processing machine XXX is ended, the user cuts the medium 30 at the position of the cutting line CL2 and separates the region of the medium 30 corresponding to the print job BB from the print result 304 as the roll body. The region of the medium 30 corresponding to the print job BB which is separated in this way, that is, the region from the cutting line CL4 to the cutting line CL2 is wound in a roll shape by the winding device of the post-processing machine XXX and becomes a roll body (hereinafter, a second roll body). The second roll body is set in the post-processing machine YYY after the secondary post-processing information 35b2 printed on the second roll body is confirmed and the secondary post-processing on the first roll body is ended. Similarly to the case in which the code image is included in the primary post-processing information 35b1, the code image may be included in the secondary post-processing information 35b2 and 35f2. The code image includes, as information, a temporary stop instruction of the transport at the time of the secondary post-processing or includes a setting change instruction of the post-processing as information.

Subsequently, the user confirms the primary post-processing information 35a1 printed on the medium 30 continuously fed out from the roll body set in the post-processing machine XXX, performs necessary settings such as a blade die according to the primary post-processing information 35a1, and causes the post-processing machine XXX to start the primary post-processing for the region of the image 33a.

Further, when the code information is printed on the primary post-processing information 35a1, the post-processing machine XXX can automatically temporarily stop the transport when the code image is read from the medium 30 being transported after die-cutting of the label for the region of the image 33b is ended using a camera capable of reading the code image or a code analysis function provided in the post-processing machine XXX for the primary post-processing. Of course, when the primary post-processing information 35a1 indicates a die-cutting machine other than the post-processing machine XXX, the user sets the print result 304 after the first roll body and the second roll body are cut off into the die-cutting machine indicated by the primary post-processing information 35a1, and starts the primary post-processing for the region of the image 33a. When die-cutting of the label for the region of the image 33a by any one of the die-cutting machines is ended, the user cuts the medium 30 at the position of the cutting line CL3 and separates the region of the medium 30 corresponding to the print job AA from the print result 304. The region of the medium 30 corresponding to the separated print job AA, that is, the region from the cutting line CL2 to the cutting line CL3 is also wound into a roll shape to form a roll body (hereinafter referred to as a third roll body). In accordance with the secondary post-processing information 35a2 printed on the third roll body, the user makes necessary settings for the post-processing machine necessary for the secondary post-processing of the third roll body. Then, the post-processing machine in which the third roll body is set is caused to perform the secondary post-processing on the region of the image 33a corresponding to the print job AA.

3.3. Third Printing Example

The third printing example is different from the first printing example and the second printing example in that the form of separation into the roll body differs according to the post-processing performed on each of the adjacent print jobs regardless of whether or not the collective print job group is set.

Figure 18:
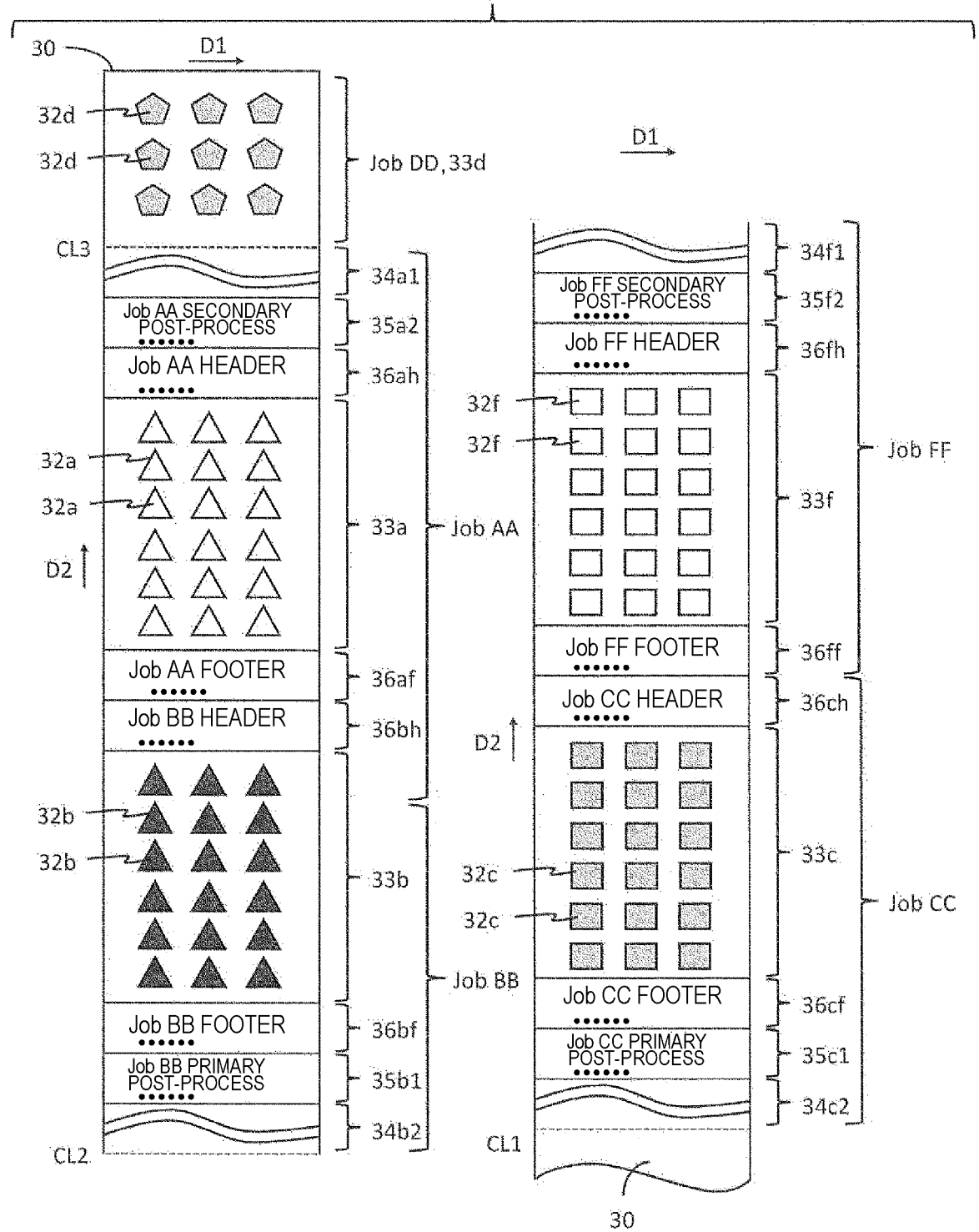
FIG. 18 is a diagram illustrating a print result for describing a third printing example.

FIG. 18 shows a print result 305 for describing the third printing example. The print result 305 is different from the print result 301 of FIG. 11 in that a shape of the object 32a constituting the image 33a corresponding to the print job AA is the same as a shape of the object 32b constituting the image 33b corresponding to the print job BB. In addition, the primary post-processing information 35a1 of the print job AA, the rear margin 34a2 of the print job AA, the front margin 34b1 of the print job BB, and the secondary post-processing information 35b2 of the print job BB, which are disposed between the footer 36af of the print job AA and the header 36bh of the print job BB, are not disposed. In addition, while the setting change instruction 37b is printed on the downstream of the rear margin 34b2 of the print job BB in the print result 301, the primary post-processing information 35b1 of the print job BB is printed in the print result 305. Further, while the setting change instruction 37f is printed on the downstream of the header 36fh of the print job FF in the print result 301, the secondary post-processing information 35C of the print job FF is printed in the print result 305. Further, the cutting line CL2 set between the rear margin 34a2 of the print job AA and the front margin 34b1 of the print job BB in the print result 301 is set between the rear margin 34b2 of the print job BB and the front margin 34f1 of the print job FF in the print result 305. The cutting line CL2 of the print result 305 is the same as the cutting line CL4 in the print result 304 of FIG. 16.

The post-processing comparison determination processing in the third printing example will be described with reference to the print result 305 in FIG. 18. As described above, the print result 305 printed in the third printing example is different from the first printing example and the second printing example in that the form of separation into the roll body differs according to the post-processing performed on each of the adjacent print jobs regardless of whether or not the collective print job group is set. Specifically, regardless of whether or not the adjacent print jobs are included in the same collective print job group, when the settings of the post-processing performed on the adjacent print jobs is the same, the adjacent print jobs are wound around the same roll body, and when the settings of the post-processing are different from each other, the print result is cut at a position between the adjacent images of the adjacent print jobs to separate the adjacent print jobs into separate roll bodies. Therefore, unlike the first printing example and the second printing example, the post-processing comparison determination processing is performed on all adjacent print jobs. The flowchart of the post-processing comparison determination processing in the third printing example is the same as that of the second printing example illustrated in FIG. 17. However, a target in which the post-processing comparison determination processing is performed is different from that of the second printing embodiment. Further, in the third printing example, the determination in Step S1306 is replaced with the determination "Has n+1 reached the number of print jobs in which the second print mode (the main printing) has been designated?."

In the drawing 13C, the post-processing setting information of each of the print jobs in which the main printing is designated in the third printing example is illustrated by Table 44 for easy comparison. Referring to Table 44, the post-processing setting information is different between the print job BB and the print job FF. Therefore, in the third printing example, the control unit 11 has a setting to cut the print result at a position between the image 33b corresponding to the print job BB and the image 33f corresponding to the print job FF on the medium 30. Therefore, since the corresponding post-processing information is printed at a position between the image 33b corresponding to the print job BB and the image 33f corresponding to the print job FF, nothing is performed in Step S1304B of FIG. 17, and the post-processing information originally set to be printed is utilized as it is. On the other hand, according to Table 44, the print job FF and the print job CC have the same post-processing setting information. Therefore, in the flowchart of FIG. 17, the control unit 11 changes the print setting so that the post-processing information is not printed at a position between the image 33f corresponding to the print job FF and the image 33c corresponding to the print job CC on the medium 30 (Step S1305). Similarly, the print job BB and the print job AA have the same post-processing setting information. Therefore, in the flowchart of FIG. 17, the control unit 11 changes the print setting so that the post-processing information is not printed at a position between the image 33b corresponding to the print job BB and the image 33a corresponding to the print job AA on the medium 30 (Step S1305).

When such a print result is output, the user can proceed with the post-processing as follows. Here, only points different from the second printing example will be described. The user confirms the primary post-processing information 35b1 of the print job BB, replaces the current blade die aaa with the blade die bbb, and restarts the transport of the medium 30 by the post-processing machine XXX. Then, die-cutting of the label for the region of the image 33b is performed, and then die-cutting of the label for the region of the image 33a is performed by the post-processing machine XXX.

When die-cutting of the label for the region of the image 33a by the post-processing machine XXX is ended, the user cuts the medium 30 at the position of the cutting line CL3 and separates the region of the medium 30 corresponding to the print job AA and the print job BB from the print result 305. The separated region of the medium 30 corresponding to the print job AA and the print job BB, that is, the region from the cutting line CL2 to the cutting line CL3 is wound in a roll shape to form a roll body (hereinafter referred to as a fourth roll body).

As described above, in the third printing example, although the print job AA and the print job BB are not included in the same collective print job group, the print job AA and the print job BB have the same post-processing setting information related to the primary post-processing, and thus the print job AA and the print job BB are wound around the same roll body (the fourth roll body). Next, in accordance with the secondary post-processing information 35a2 printed on the fourth roll body, the user makes necessary settings for the post-processing machine necessary for the secondary post-processing of the fourth roll body. Then, the post-processing machine in which the fourth roll body is set is caused to perform the secondary post-processing on the region of the image 33a corresponding to the print job AA, and subsequently, the secondary post-processing is performed on the region of the image 33b.

As described above, although the first printing example, the second printing example, and the third printing example are different from each other at the position (unit) and/or the timing at which the print result is cut, cutting information that is information defining the unit and the timing of cutting is set in the printing apparatus 10 in advance. Alternatively, the user may arbitrarily set the cutting information as the print setting information. The cutting information is also referred to as a cutting mode. For example, as the cutting mode, a first cutting mode corresponding to the first print embodiment, a second cutting mode corresponding to the second print embodiment, and a third cutting mode corresponding to the third print embodiment can be set as the print setting information, and in Step S120, the setting information acquisition unit 12c acquires the cutting mode to be set for the print job registered in the print waiting list 55 as the print setting information. Then, in Step S130, based on the cutting mode acquired as a part of the print setting information, the control unit 11 determines the print job to be subjected to the post-processing comparison determination processing and the print processing to be performed when the post-processing setting needs to be changed. In this way, the cutting mode may be set as print setting information.

That is, the control unit 11 performs the first printing example when the first cutting mode is designated as the cutting information, performs the second printing example when the second cutting mode is designated as the cutting information, and performs the third printing example when the third cutting mode is designated as the cutting information. As can be understood from the above description, when the first cutting mode or the second cutting mode is designated, the control unit 11 compares the post-processing setting information of the print jobs included in the same collective print job group and adjacent to each other in the print order and proceeds to Step S1304 (or Step S1304B) or Step S1305. Further, when the third cutting mode is designated, the control unit 11 compares the post-processing setting information of the print jobs adjacent to each other in the print order regardless of whether or not the print jobs are included in the collective print job group as long as they are the print jobs in which the main printing is designated, and proceeds to Step S1304B or Step S1305.

The first cutting mode and the second cutting mode are also collectively referred to as first cutting information, and the third cutting mode is also referred to as second cutting information. That is, when the cutting information is the first cutting information, the control unit 11 compares the n-th post-processing setting information with the (n+1)-th post-processing setting information with respect to the relationship between the n-th print job and the (n+1)-th print job included in the collective print job group. On the other hand, when the cutting information is the second cutting information, the comparison between the n-th post-processing setting information and the (n+1)-th post-processing setting information is performed for all the designated print jobs associated with the post-processing setting information.

Several modified examples included in the present embodiment will be described below. It goes without saying that combinations of the above-described embodiments, combinations of the embodiments and modified examples, and combinations of the modified examples are included in the disclosure according to the present specification.

4. First Modified Example

As described above, the specific setting information acquired for the print job in which the designation of the second print mode is received includes the post-processing setting information. Such post-processing setting information may include "format information" for designating a print format of the setting change instruction. The format information is, for example, information for designating various formats such as font, character size, color, thickness, underline, and decoration such as shading, and can be generated in advance by the user. When the printing unit 18 is caused to perform printing of the collective print job group in Step S140, the control unit 11 causes the printing unit 18 to print the setting change instruction in the print format designated by the format information.

As a result, referring to the example of FIG. 11, the characters in the setting change instruction 37b and the characters in the setting change instruction 37f are printed in the print format designated by the format information. As a result, the characters of the instruction to replace the blade die in the setting change instruction 37b and the characters of the instruction to change the number of slits in the setting change instruction 37f are different in font, size, color, and the like from the characters and the like in the other regions of the medium 30 and thus stand out, and the user can more easily recognize the setting change instruction.

Furthermore, the control unit 11 may change the print format of the setting change instruction within a range designated by the format information according to the comparison result between the n-th post-processing setting information and the (n+1)-th post-processing setting information and cause the printing unit 18 to print the setting change instruction. In this case, the format information designates a plurality of print formats in advance.

Specific examples will be described below. For example, when the post-processing setting information of the print job BB and the print job FF forming the group G1 is compared, there is a case in which the post-processing machine used for the primary post-processing is the same but the blade die is different as illustrated in FIG. 13A, or there is a case in which both the post-processing machine and the blade die used for the primary post-processing are different. When the post-processing setting information of the print job BB is compared with that of the print job FF, there is a case in which the post-processing machine used for the secondary post-processing is the same but the number of slits is different as illustrated in FIG. 13A, or there is a case in which both the post-processing machine used for the secondary post-processing and the number of slits are different.

Therefore, for example, the control unit 11 makes the print format of the setting change instruction different between a case in which the post-processing machine used for the primary post-processing is the same and the blade die is different between the print jobs and a case in which both the post-processing machine and the blade die used for the primary post-processing are different between the print jobs. In this case, when the post-processing machine used for the primary post-processing are the same and the blade die are different between the print jobs, a blade die replacement instruction as the setting change instruction is printed in, for example, a first font, a first character size, a first color, and the like, and when both the post-processing machine and the blade die used for the primary post-processing are different between print jobs, an instruction to change the post-processing machine and blade die as the setting change instruction is printed in a second font, a second character size, a second color, and the like. In addition, when both the post-processing machine and the blade die used for the primary post-processing are different between the print jobs, the control unit 11 may print a change instruction of the post-processing machine and a change instruction of the blade die as the setting change instruction in different fonts, character sizes, colors, or the like. Similarly, regarding the setting change instruction related to the secondary post-processing, the print format can be changed according to the comparison result of the post-processing setting information between print jobs.

5. Second Modified Example

A second modified example will be described with reference to FIGS. 13B and 14.

In FIG. 13B, the post-processing setting information of each of the print job FF, the print job CC, the print job BB, and the print job AA forming a certain collective print job group is illustrated by Table 43 for easy comparison. The view of Table 43 is the same as the view of Table 42. According to Table 43, for both the print job FF and the print job CC, the post-processing machine XXX is used and the blade die aaa is used for the die-cutting of the label in the primary post-processing. In addition, although a post-processing machine ZZZ is used for die-cutting the label for both the print job BB and the print job AA, the blade die bbb is used for the print job BB and the blade die ccc is used for the print job AA. In addition, a post-processing machine YYY is used to cut the medium 30 in the secondary post-processing for any of the print job FF, the print job CC, the print job BB, and the print job AA, the medium 30 is cut with the number of slits=2 for the print job FF, and the medium 30 is cut with the number of slits=4 for the print job CC, the print job BB, and the print job AA.

In the second modified example, it is assumed that the control unit 11 causes the printing unit 18 to perform the main printing of a collective print job group including the print job FF, the print job CC, the print job BB, and the print job AA on the medium 30 in the order of the print jobs and in accordance with the post-processing setting information in Table 43. FIG. 14 illustrates the medium 30 on which the collective print job group according to the second modified example is printed as a print result 302. The view of FIG. 14 is basically the same as the view of the print result 301 of FIG. 11, but is more simplified than the print result 301.

Figure 14:
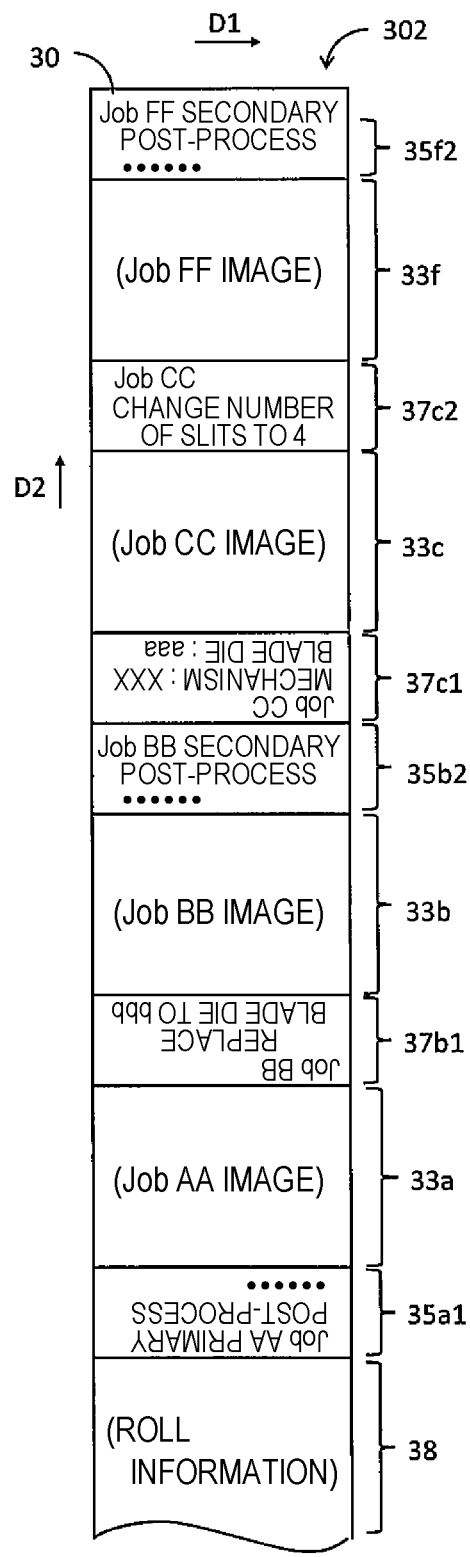
FIG. 14 is a diagram illustrating a print result according to a second modified example.

In FIG. 14, a front margin, a rear margin, a header, and a footer in the medium 30 are omitted. For the image 33f, the image 33c, the image 33b, and the image 33a, which are images printed in a plurality of copies based on the image data of each of the print job FF, the print job CC, the print job BB, and the print job AA, the description of the individual objects as illustrated in FIG. 11 will be omitted.

According to the print result 302, the secondary post-processing information 35f2 which is the post-processing setting information for the secondary post-processing of the print job FF is printed on the most downstream. An image 33f corresponding to the print job FF, a setting change instruction 37c2 for the secondary post-processing of the print job CC, an image 33c corresponding to the print job CC, a setting change instruction 37c1 for the primary post-processing of the print job CC, and secondary post-processing information 35b2 which is the post-processing setting information for the secondary post-processing of the print job BB are printed in this order from the secondary post-processing information 35f2 toward the upstream. Further, an image 33b corresponding to the print job BB, a setting change instruction 37b1 for the primary post-processing of the print job BB, an image 33a corresponding to the print job AA, primary post-processing information 35a1 which is the post-processing setting information for the primary post-processing of the print job AA, and roll information 38 are printed in order toward the upstream. In the print result 302, a region in which the roll information 38 is printed is cut from the print result 302 before the start of the primary post-processing.

According to the print result 302, characters of the primary post-processing information 35a1, the setting change instruction 37b1, and the setting change instruction 37c1, which are printing for the primary post-processing, are printed with the upstream facing upward and the downstream facing downward. On the other hand, characters of the secondary post-processing information 35f2, the setting change instruction 37c2, and the secondary post-processing information 35b2, which are printing for the secondary post-processing, are printed with the downstream facing upward and the upstream facing downward. According to such printing, the user can easily read the primary post-processing information 35a1, the setting change instruction 37b1, and the setting change instruction 37c1 when the primary post-processing is performed with the upstream of the medium 30 facing the leading side of the transport, and the user can accurately recognize the information necessary for the primary post-processing. In addition, the secondary post-processing information 35f2, the setting change instruction 37c, and the secondary post-processing information 35b2 are oriented so as to be easily read by the user when the secondary post-processing is performed with the downstream of the medium 30 facing the leading side of the transport.

As can be seen from the above description, the setting change instruction 37b1 and the setting change instruction 37c1 each correspond to an example of a first change instruction, and the setting change instruction 37c2 corresponds to an example of a second change instruction. That is, according to the second modified example, when characters are included in the first change instruction and the second change instruction, the control unit 11 causes the printing unit 18 to print the characters of the first change instruction and the characters of the second change instruction in different directions. When the direction of the characters of the first change instruction and the direction of the characters of the second change instruction are different from each other, the directions may be opposite to each other in the widthwise direction D1 instead of being opposite to each other in the transport direction D2 as illustrated in FIG. 14. In addition, the direction of the characters of the first change instruction and the direction of the characters of the second change instruction may not only be exactly opposite to each other but also be different from each other by 90 degrees, for example.

Focusing on the first change instruction in FIG. 14, since there is no difference in the post-processing setting information of the primary post-processing between the print job CC and the print job FF, the first change instruction is not printed between the image 33c and the image 33f. Focusing on the second change instruction in FIG. 14, since there is no difference in the post-processing setting information of the secondary post-processing between the print job BB and the print job AA, the second change instruction is not printed between the image 33b and the image 33a.

Further, as illustrated in FIG. 13B, the post-processing setting information of the secondary post-processing for the print job CC, the print job BB, and the print job AA which are continuously printed is common. For this reason, when the setting change instruction 37c2 is present on the downstream of the image 33c in the print result 302, the secondary post-processing information 35b2 printed on the downstream of the image 33b is originally supposed to be unnecessary. However, in the second modified example, the post-processing machine for the primary post-processing is changed from the post-processing machine ZZZ to the post-processing machine XXX between the primary post-processing for the region of the image 33b and the primary post-processing for the region of the image 33c. Therefore, the portion of the medium 30 including the region of the image 33a and the region of the image 33b are cut from the roll body and are subjected to the secondary post-processing at the timing when the primary post-processing for the region of the image 33b by the post-processing machine ZZZ is ended. The roll body remaining after the portion of the medium 30 including the region of the image 33a and the region of the image 33b is cut off is, needless to say, set in the post-processing machine XXX for the primary post-processing.

After the separation from the roll body, when there is no printing for the secondary post-processing in a downstream end portion of the portion of the medium 30 including the region of the image 33a and the region of the image 33b, the setting of the number of slits and the like in the secondary post-processing performed on the portion by the post-processing machine YYY is unclear. In view of such circumstances, the control unit 11 controls the printing of the collective print job group so that the secondary post-processing information 35b2 necessary for the secondary post-processing on the portion of the medium 30 cut from the roll body during the primary post-processing is printed.

6. Third Modified Example

"Tertiary post-processing" may be performed on the medium 30 after printing by the printing unit 18 as post-processing subsequent to the secondary post-processing. As in the primary post-processing, the tertiary post-processing is performed on the medium 30 in the order of the region of the (n+1)-th image and the region of the n-th image. When it is assumed that the tertiary post-processing is performed, the post-processing setting information associated with the print job includes information of each of the primary post-processing, the secondary post-processing, and the tertiary post-processing.

Therefore, when the control unit 11 compares the n-th post-processing setting information with the (n+1)-th post-processing setting information and determines that it is necessary to change the setting of the tertiary post-processing for the region of the n-th image on the medium 30, the control unit 11 may cause the printing unit 18 to print a "third change instruction" which is an instruction to change the setting of the tertiary post-processing at a position between the first change instruction and the n-th image on the medium 30.

Figure 15:
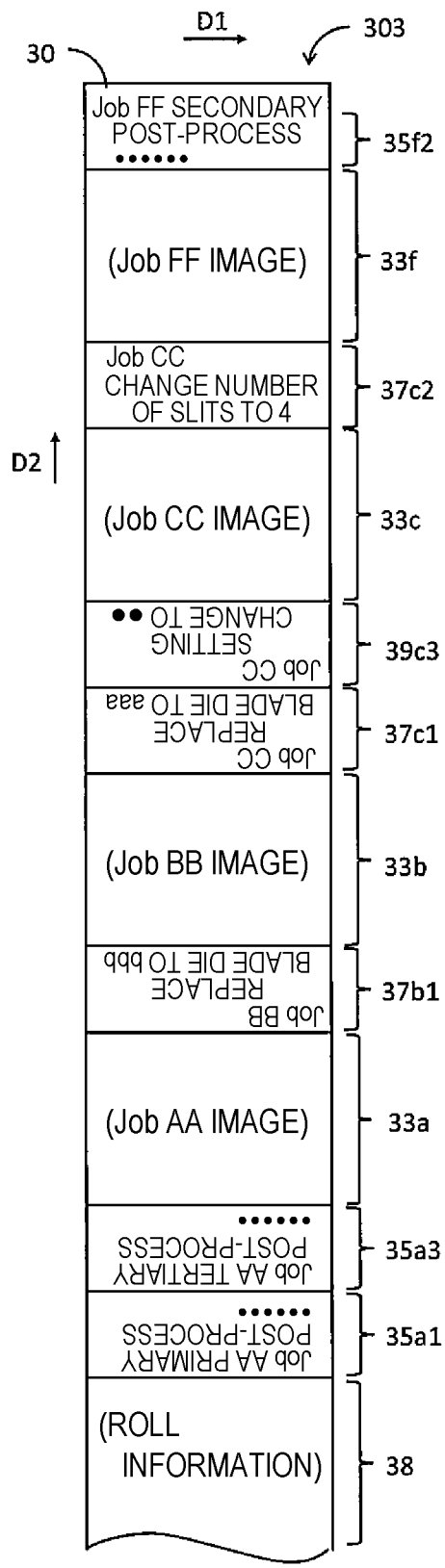
FIG. 15 is a diagram illustrating a print result according to a third modified example.

FIG. 15 illustrates the medium 30 on which the collective print job group according to the third modified example is printed as a print result 303. In FIG. 15, a difference from FIG. 14 will be mainly described. Also in the third modified example, it is assumed that the collective print job group including the print job FF, the print job CC, the print job BB, and the print job AA is main-printed on the medium 30 by the printing unit 18 in the order of the print jobs generally in accordance with the post-processing setting information of Table 43. However, in order to simplify the description, it is assumed that the primary post-processing is performed by the post-processing machine ZZZ for any print job.

Therefore, the secondary post-processing information 35$b$2 included in the print result 302 of FIG. 14 is not necessary in the third modified example and is not included in the print result 303. In addition, the setting change instruction 37$c$1 included in the print result 302 is the content of instructing the change of not only the blade die but also the mechanism, that is, the post-processing machine, but the setting change instruction 37$c$1 included in the print result 303 is sufficient as the content of instructing the replacement of the blade die.

In the third modified example, according to the post-processing setting information associated with the print job, the tertiary post-processing performed on the regions of the images 33$a$, 33$b$, 33$c$, and 33$f$ of the print job AA, the print job BB, the print job CC, and the print job FF is processing in which a part of the setting should be changed after the tertiary post-processing on the region of the image 33$b$ and before the tertiary post-processing on the region of the image 33$c$. What kind of post-processing the tertiary post-processing is does not matter here. Although the tertiary post-processing is various such as, for example, processing using heat or processing of drilling holes in the medium 30, it is necessary to change a part of the setting of the tertiary post-processing after the tertiary post-processing on the region of the image 33$b$ and before the tertiary post-processing on the region of the image 33$c$ in any case, in the third modified example. Therefore, when the image 33$b$ corresponding to the print job BB is regarded as the (n+1)-th image and the image 33$c$ corresponding to the print job CC is regarded as the n-th image, the control unit 11 determines that it is necessary to change the setting of the tertiary post-processing for the region of the n-th image. Based on this determination, the control unit 11 prints the setting change instruction 39$c$3 as the third change instruction at a position between the setting change instruction 37$c$1 as the first change instruction for the region of the image 33$c$ and the image 33$c$.

As described above, due to the setting change instruction 39$c$3 being included in the print result 303, when the roll body of the print result 303 is set in the post-processing machine of the tertiary post-processing and the tertiary post-processing is started after the end of the secondary post-processing for the print result 303, the user can change the setting of the tertiary post-processing at an appropriate timing according to the setting change instruction 39$c$3. Incidentally, the tertiary post-processing information 35$a$3 in the print result 303 is printed between the primary post-processing information 35$a$1 for the image 33$a$ of the print job AA and the image 33$a$, and represents the post-processing setting information necessary for the tertiary post-processing on the region of the image 33$a$. That is, the tertiary post-processing information 35$a$3 and the setting change instruction 39$c$3 are printing for the tertiary post-processing. In addition, according to the print result 303, characters of the printing for the tertiary post-processing are printed with the upstream facing upward and the downstream facing downward, similarly to the primary post-processing information 35$a$1, the setting change instruction 37$b$1, and the setting change instruction 37$c$1 which are the printing for the primary post-processing.

Although the front margin and the rear margin as illustrated in FIG. 11 are not illustrated in FIGS. 14 and 15, actually, the front margin and the rear margin are secured on the medium 30 in accordance with the setting of an amount of margin of each of the print jobs to be subjected to the main printing. In addition, in the above description, it is assumed that the setting change instructions 37$b$, 37$f$, 37$c$2, 37$c$1, 37$b$1, and 39$c$3 are printed in a region secured separately from the front margin and the rear margin on the medium 30, and the setting change instructions may be printed in the front margin or the rear margin. The primary post-processing information, the secondary post-processing information, and the tertiary post-processing information may also be printed in the front margin or the rear margin. Thus, in the main printing, the consumption of the medium 30 can be further curbed.

7. Conclusion

As described above, according to the present embodiment, the printing apparatus 10 includes the printing unit 18 that prints a print job on the medium 30, the control unit 11 that can receive designation of the first print mode or the second print mode for one or more print jobs, performs print setting according to the print setting information for the print job in which the first print mode or the second print mode is designated, and causes the printing unit 18 to perform printing according to the print setting, and the storage unit 15. The amount of consumption of the medium 30 in the printing of one print job in the second print mode is larger than the amount of consumption of the medium 30 in the printing of one print job in the first print mode. The control unit 11 acquires specific setting information that causes a difference in the amount of consumption between printing in the first print mode and printing in the second print mode in the print setting information for a print job in which the first print mode is designated from any one of initial setting information of printing stored in advance in the storage unit 15, accompanied setting information accompanied by the print job in which the first print mode is designated, and the first setting information file which is a file that is stored in a desired folder and is different from both the initial setting information and the accompanied setting information, and performs print setting of the print job in which the first print mode is designated according to the acquired specific setting information. Further, the control unit 11 acquires the specific setting information in the print setting information for the print job in which the second print mode is designated from any one of accompanied setting information accompanied by the print job in which the second print mode is designated, and the second setting information file which is a file that is stored in a desired folder and is different from any of the initial setting information, the accompanied setting information, and the first setting information when the specific setting information for the print job in which the first print mode is designated is acquired from the initial setting information; acquires the specific setting information for the print job in which the second print mode is designated from the second setting information file when the specific setting information for the print job in which the first print mode is designated is acquired from the accompanied setting information; acquires the specific setting information for the print job in which the second print mode is designated from any one of the accompanied setting information accompanied by the print job in which the second print mode is designated and the second setting information file when the specific setting information for the print job in which the first print mode is designated is acquired from the first setting information file; and performs print settings for the print job in which the second print mode is designated according to the acquired specific setting information for the print job in which the second print mode is designated.

According to the configuration described above, the printing apparatus 10 can easily acquire the specific setting information necessary for the print setting of the print job in which the first print mode is designated and the specific setting information necessary for the print setting of the print job in which the second print mode is designated from different acquisition sources. Therefore, when the user arbitrarily designates the first print mode or the second print mode for the print job, the user is relieved from the burden and troublesomeness of setting the specific setting information necessary for each mode by himself/herself, and can automatically obtain the accurate print setting.

According to the present embodiment, the specific setting information includes information of the number of print copies.

In addition, the specific setting information includes information of an amount of margin to be secured in the medium 30.

In addition, the specific setting information includes information indicating presence or absence of printing for post-processing performed on the medium 30 after printing of the print job by the printing unit 18.

Further, the specific setting information includes information indicating whether or not the header and/or the footer of the print job is printed.

According to the configuration, the printing apparatus 10 can accurately acquire the settings such as the number of print copies, the amount of margin, the presence or absence of printing for post-processing, and the presence or absence of printing of the header and/or the footer of the print job which are different between the first print mode and the second print mode, while the burden on the user is reduced.

In addition, according to the present embodiment, the printing apparatus 10 may include the display unit 13 that displays a list of the print jobs, and the control unit 11 may receive a state in which the selection field 56 displayed corresponding to each of the print jobs in the list is not selected as the designation of the first print mode, and receive a state in which the selection field 56 is selected as the designation of the second print mode.

According to the configuration, the user can easily and accurately designate the first print mode or the second print mode for the print job.

In addition, according to the present embodiment, the printing apparatus 10 may include the display unit 13 that displays a list of the print jobs, and the control unit 11 may receive a state that is not included in a selection range input by the user in the list as the designation of the first print mode, and receive a state that is included in the selection range as the designation of the second print mode.

According to the configuration, the user can easily and accurately designate the first print mode or the second print mode for the print job.

Further, according to the present embodiment, the printing apparatus 10 includes a collective reception button that collectively receives the designation of the second print mode for a plurality of print jobs, and when the collective reception button is operated, the control unit 11 collectively receives the designation of the second print mode for the plurality of print jobs described in the second setting information file, and acquires the specific setting information for the plurality of print jobs in which the second print mode is designated from the second setting information file.

According to the configuration, the user can collectively designate the second print mode for the plurality of print jobs described in the second setting information file by operating the collective reception button.

According to the embodiment, the printing apparatus 10 includes the printing unit 18 that prints an image on a medium based on image data, the storage unit 15 that stores a print job having the image data, and the control unit 11 that performs print setting on the printing unit 18 based on print setting information including post-processing setting information indicating setting of post-processing to be performed on the medium 30 on which the image is printed and causes the printing unit 18 to print two or more designated print jobs among the plurality of print jobs stored in the storage unit 15. When n is an integer greater than or equal to 1, and an image printed on the medium 30 based on the image data of the n-th print job as an n-th print target by the printing unit 18 among the two or more print jobs is an n-th image, and an image printed on the medium 30 based on the image data of the (n+1)-th print job as a (n+1)-th print target by the printing unit 18 among the two or more print jobs is a (n+1)-th image, and the post-processing setting information associated with the n-th print job is n-th post-processing setting information, and the post-processing setting information associated with the (n+1)-th print job is (n+1)-th post-processing setting information, the control unit 11 compares the n-th post-processing setting information with the (n+1)-th post-processing setting information to determine whether or not setting of the post-processing needs to be changed, and changes the print setting so as not to print information based on the post-processing setting information set to be printed at a position between the n-th image and the (n+1)-th image on the medium 30 as the print setting for the printing unit 18 when the setting of the post-processing does not need to be changed.

According to the configuration, when there is no change in the setting of the post-processing between the n-th print job and the (n+1)-th print job to be continuously printed, the printing apparatus 10 does not print the information based on the post-processing setting information set to be printed at the position between the n-th image and the (n+1)-th image on the medium 30. Thus, when there is no change in the setting of the post-processing between the n-th print job and the (n+1)-th print job, it is possible to avoid printing related to the setting of the post-processing at the position between the n-th image and the (n+1)-th image. That is, it is possible to perform printing necessary for the post-processing while waste of the medium 30 and ink is curbed.

In addition, according to the present embodiment, the print setting information may include information of an amount of margin on the medium 30, and when there is no need to change the setting of the post-processing, the control unit 11 may change the print setting so as not to secure a margin set to be secured between the n-th image and the (n+1)-th image on the medium 30 according to the information of the amount of margin.

According to the configuration, when there is no change in the setting of the post-processing between the n-th print job and the (n+1)-th print job, the control unit 11 does not secure the margin set to be secured between the n-th image and the (n+1)-th image in the medium 30. As a result, the amount of consumption of the medium 30 can be curbed.

According to the present embodiment, when the setting of the post-processing needs to be changed, the control unit 11 causes the printing unit 18 to print at least one of a change instruction of the setting of the post-processing and a stop instruction of transport of the medium 30 at a position between the n-th image and the (n+1)-th image on the medium 30.

According to the configuration, when there is a change in the setting of the post-processing between the n-th print job and the (n+1)-th print job, the control unit 11 prints an instruction for the change or an instruction to stop the transport between the n-th image and the (n+1)-th image on medium 30, thereby improving workability and convenience in the post-processing. In addition, since there is no need for the user to determine a position at which the change instruction or the stop instruction is to be printed on the medium 30, the burden on the user is reduced, and it is possible to eliminate a human error in determining the position at which the change instruction or the stop instruction is to be printed.

Further, according to the present embodiment, when the setting of the post-processing needs to be changed, the control unit 11 may cause the change instruction and the stop instruction to be printed at a position between the n-th image and the (n+1)-th image on the medium 30.

According to the configuration, the control unit 11 prints the change instruction and the stop instruction of the transport at the position between the n-th image and the (n+1)-th image on the medium 30. Thus, in a post-processing machine that performs the post-processing, it is possible to stop the transport of the medium 30 at an appropriate timing at which the setting should be changed and perform a change operation.

According to the present embodiment, when the setting of the post-processing needs to be changed, the control unit 11 may cause the printing unit 18 to print the information based on the post-processing setting information and the instruction to stop the transport of the medium 30 at a position between the n-th image and the (n+1)-th image on the medium 30.

According to the configuration, the control unit 11 prints the information based on the post-processing setting information together with the instruction to stop the transport at the position between the n-th image and the (n+1)-th image on the medium 30. The change instruction can be said to be a kind of information based on the post-processing setting information, but the information based on the post-processing setting information includes information other than the change instruction of the setting of the post-processing. Therefore, for example, even when the medium 30 is cut between the n-th image and the (n+1)-th image, since the information based on the post-processing setting information is printed, the user who performs the post-processing can obtain more information.

Further, according to the present embodiment, the control unit 11 may set a plurality of print jobs included in the designated two or more print jobs to a collective print job group which is a group having a common denominator, and the comparison between the n-th post-processing setting information and the (n+1)-th post-processing setting information may be performed on the relationship between the n-th print job and the (n+1)-th print job included in the collective print job group.

According to the configuration, when there is no change in the post-processing setting between the n-th print job and the (n+1)-th print job that are included the collective print job group and are to be continuously printed, the control unit 11 does not print the information based on the post-processing setting information set to be printed at the position between the n-th image and the (n+1)-th image on the medium 30. Thus, for example, when the medium 30 is cut in collective print job group units, it is possible to curb an amount of medium required for printing of one collective print job group.

The plurality of print jobs included in the designated two or more print jobs means all or some of the designated two or more print jobs. For example, the two or more print jobs in which the second print mode is designated by the user through an operation of the management screen 50 may include a collective print job group and a print job that is not included in the collective print job group. Further, the two or more print jobs designated by the user through the operation of the management screen 50 may include a plurality of collective print job groups.

In addition, according to the present embodiment, the print setting information includes cutting information which is information defining in what unit the medium 30 is cut. The control unit 11 can set a plurality of print jobs included in the designated two or more print jobs to a collective print job group having a common denominator, and when the cutting information is first cutting information, the comparison between the n-th post-processing setting information and the (n+1)-th post-processing setting information may be performed on the relationship between the n-th print job and the (n+1)-th print job included in the collective print job group, and when the cutting information is second cutting information, the comparison between the n-th post-processing setting information and the (n+1)-th post-processing setting information may be performed on all the print jobs associated with the post-processing setting information as the designated print jobs.

According to the configuration, the control unit 11 limits or does not limit a range of the print jobs to be compared when comparing the post-processing setting information between the print jobs adjacent to each other in the print order within the collective print job group according to the cutting information. Thus, the position on the medium 30 at which the information based on the post-processing setting information is not printed when there is no change in the setting of the post-processing can be changed in accordance with the cutting information.

Further, according to the present embodiment, the post-processing setting information associated with the print job may be described in a header of the image data included in the print job.

According to the configuration, since the print job and the post-processing setting information are integrated, transmission of the print job and the post-processing setting information to the printing apparatus 10 and acquisition processing of the post-processing setting information associated with the print job are simplified.

Further, according to the present embodiment, the post-processing setting information may include format information for designating a print format of a change instruction, and the control unit 11 may cause the printing unit 18 to print a change instruction in a print format designated by the format information.

According to the configuration, in the medium 30 on which the n-th image, the (n+1)-th image, the change instruction, and the like are printed, it is possible to cause the user to easily recognize the presence of the change instruction.

Further, according to the present embodiment, the control unit 11 may change the print format of the change instruction within a range designated by the format information in accordance with a comparison result between the n-th post-processing setting information and the (n+1)-th post-processing setting information, and cause the printing unit 18 to print the change instruction.

According to the configuration, the control unit 11 changes the print format of the change instruction in accordance with the comparison result between the n-th post-processing setting information and the (n+1)-th post-processing setting information, and thus it is possible to enhance the convenience of the user who visually recognizes the printed change instruction and performs a setting change operation of the post-processing.

In addition, according to the present embodiment, the control unit 11 causes the printing unit 18 to print the change instruction using any one of a character, a code image, and a combination of a character and a code image.

According to the configuration, it is possible to print the change instruction in a form that is easy for the user to understand and a form that is easy for a post-processing machine to use.

According to the present embodiment, when the post-processing performed first on the medium 30 after printing by the printing unit 18 is primary post-processing and the post-processing subsequently to the primary post-processing on the medium 30 after printing by the printing unit 18 is secondary post-processing, the primary post-processing is performed in the order of a region of a (n+1)-th image and a region of an n-th image on the medium 30, and the secondary post-processing is performed in the order of the region of the n-th image and the region of the (n+1)-th image on the medium 30. Then, when the control unit 11 compares the n-th post-processing setting information with the (n+1)-th post-processing setting information, and determines that it is necessary to change setting of the primary post-processing for the region of the n-th image on the medium 30, the control unit 11 causes the printing unit 18 to print a first change instruction which is an instruction to change the setting of the primary post-processing at a position between the n-th image and the (n+1)-th image on the medium 30. Further, when the control unit 11 compares the n-th post-processing setting information with the (n+1)-th post-processing setting information and determines that it is necessary to change the setting of the secondary post-processing for the region of the (n+1)-th image on the medium 30, the control unit 11 causes the printing unit 18 to print a second change instruction which is an instruction to change the setting of the secondary post-processing at a position between the n-th image and the (n+1)-th image on the medium 30.

According to the configuration, the control unit 11 compares the n-th post-processing setting information with the (n+1)-th post-processing setting information, and prints the first change instruction on the medium 30 when the change instruction is necessary for the primary post-processing on the region of the n-th image, and prints the second change instruction on the medium 30 when the change instruction is necessary for the secondary post-processing on the region of the (n+1)-th image.

Further, according to the present embodiment, when the post-processing subsequently to the secondary post-processing on the medium 30 after printing by the printing unit 18 is tertiary post-processing, the tertiary post-processing is performed in the order of the region of the (n+1)-th image and the region of the n-th image on the medium 30. Then, when the control unit 11 compares the n-th post-processing setting information with the (n+1)-th post-processing setting information, and it is determined that it is necessary to change the setting of the tertiary post-processing for the region of the n-th image on the medium 30, the control unit 11 causes the printing unit 18 to print a third change instruction which is the change instruction of the setting of the tertiary post-processing at a position between the first change instruction and the n-th image on the medium 30.

According to the configuration, the control unit 11 compares the n-th post-processing setting information with the (n+1)-th post-processing setting information and can print the third change instruction at an appropriate position on the medium 30 when the change instruction is necessary for the tertiary post-processing on the region of the n-th image.

In addition, according to the present embodiment, when characters are included in the first change instruction and the second change instruction, the control unit 11 may cause the printing unit 18 to print the characters of the first change instruction and the characters of the second change instruction in different directions.

According to the configuration, the control unit 11 can print the characters of the first change instruction in a directions that is easy for the user to read when the medium 30 is a target of the primary post-processing, and can print the characters of the second change instruction in a direction that is easy for the user to read when the medium 30 is a target of the secondary post-processing.

In addition, according to the present embodiment, after printing on the medium 30 based on the image data of the last print job included in the collective print job group is ended, the control unit 11 may cause the printing unit 18 to print at least a part of the post-processing setting information associated with each of the print jobs included in the collective print job group at a position upstream of the image printed on the medium 30 based on the image data of the last print job in a transport direction of the medium 30 in the print order of the print jobs or in the reverse order of the printing of the print jobs. That is, roll information is printed.

According to the configuration, the user who sees the medium 30 after printing can first visually recognize the roll information and can recognize the post-processing setting information of each of the print jobs and outline of the printing of each of the print jobs performed on the medium 30.

The present embodiment is not limited to the printing apparatus 10 or printing system, and discloses disclosures in various categories, such as a method including steps performed by the apparatus or system, and a program 12 for causing a processor to perform the method.

For example, the print control program 12 makes print settings for the printing unit 18 based on the print setting information including the post-processing setting information indicating the setting of the post-processing to be performed on the medium 30 on which an image based on the image data of the print job is printed and causes the processor to perform a print control function of causing the printing unit 18 to print two or more print jobs designated from a plurality of print jobs, and when n is an integer greater than or equal to 1, and an image printed on the medium 30 based on the image data of the n-th print job as an n-th print target by the printing unit 18 among the two or more print jobs is an n-th image, and an image printed on the medium 30 based on the image data of the (n+1)-th print job as a (n+1)-th print target by the printing unit 18 among the two or more print jobs is a (n+1)-th image, and the post-processing setting information associated with the n-th print job is n-th post-processing setting information, and the post-processing setting information associated with the (n+1)-th print job is (n+1)-th post-processing setting information, the print control function compares the n-th post-processing setting information with the (n+1)-th post-processing setting information to determine whether or not setting of the post-processing needs to be changed, and changes the print setting so as not to print information based on the post-processing setting information set to be printed at a position between the n-th image and the (n+1)-th image on the medium 30 as the print setting for the printing unit 18 when the setting of the post-processing does not need to be changed.

The processing described above as being performed by the control unit 11 of the printing apparatus 10 may be performed by a print control apparatus, that is, an information processing device 1 using resources such as the control unit 2 and the storage unit 3. The print control program 12 may be performed by the information processing device 1.

Therefore, the present embodiment is, for example, a print control apparatus communicably coupled to the printing apparatus 10, and includes a storage unit 3 that stores a print job having the image data, and a control unit 2 that performs print setting on the printing apparatus 10 based on print setting information including post-processing setting information indicating setting of post-processing to be performed on the medium 30 on which the image is printed and causes the printing apparatus 10 to print two or more designated print jobs among the plurality of print jobs stored in the storage unit 3, and when n is an integer greater than or equal to 1, and an image printed on the medium 30 based on the image data of the n-th print job as an n-th print target by the printing apparatus 10 among the two or more print jobs is an n-th image, and an image printed on the medium 30 based on the image data of the (n+1)-th print job as a (n+1)-th print target by the printing apparatus 10 among the two or more print jobs is a (n+1)-th image, and the post-processing setting information associated with the n-th print job is n-th post-processing setting information, and the post-processing setting information associated with the (n+1)-th print job is (n+1)-th post-processing setting information, the control unit 2 compares the n-th post-processing setting information with the (n+1)-th post-processing setting information to determine whether or not setting of the post-processing needs to be changed, and changes the print setting so as not to print information based on the post-processing setting information set to be printed at a position between the n-th image and the (n+1)-th image on the medium 30 as the print setting for the printing apparatus 10 when the setting of the post-processing does not need to be changed.

What is claimed is:

1. A printing apparatus comprising:
   a printing unit configured to print an image on a medium based on image data;
   a storage unit configured to store a print job including the image data; and
   a control unit configured to perform print setting on the printing unit based on print setting information including post-processing setting information indicating setting of post-processing to be performed on the medium on which the image is printed and configured to cause the printing unit to print two or more designated print jobs among a plurality of print jobs stored in the storage unit, wherein
   when n is an integer greater than or equal to 1, and
   an image printed on the medium based on image data of an n-th print job as an n-th print target by the printing unit among the two or more print jobs is an n-th image, and
   an image printed on the medium based on image data of a (n+1)-th print job as a (n+1)-th print target by the printing unit among the two or more print jobs is a (n+1)-th image, and
   the post-processing setting information associated with the n-th print job is n-th post-processing setting information, and
   the post-processing setting information associated with the (n+1)-th print job is (n+1)-th post-processing setting information,
   the control unit compares the n-th post-processing setting information with the (n+1)-th post-processing setting information to determine whether or not setting of the post-processing needs to be changed, and changes the print setting so as not to print information based on the post-processing setting information set to be printed at a position between the n-th image and the (n+1)-th image on the medium as the print setting for the printing unit when the setting of the post-processing does not need to be changed.

2. The printing apparatus according to claim 1, wherein the print setting information includes information of an amount of margin in the medium, and
   when the setting of the post-processing does not need to be changed, the control unit changes the print setting so as not to secure a margin set to be secured between the n-th image and the (n+1)-th image on the medium according to the information of the amount of margin.

3. The printing apparatus according to claim 1, wherein when the setting of the post-processing needs to be changed, the control unit causes the printing unit to print at least one of a change instruction of the setting of the post-processing and a stop instruction of transport of the medium at a position between the n-th image and the (n+1)-th image on the medium.

4. The printing apparatus according to claim 3, wherein when the setting of the post-processing needs to be changed, the control unit causes the change instruction and the stop instruction to be printed at a position between the n-th image and the (n+1)-th image on the medium.

5. The printing apparatus according to claim 3, wherein the post-processing setting information includes format information for designating a print format of the change instruction, and the control unit causes the printing unit to print the change instruction in the print format designated by the format information.

6. The printing apparatus according to claim 5, wherein the control unit changes the print format of the change instruction within a range designated by the format information in accordance with a comparison result between the n-th post-processing setting information and the (n+1)-th post-processing setting information and causes the printing unit to print the change instruction.

7. The printing apparatus according to claim 3, wherein the control unit causes the printing unit to print the change instruction using any one of a character, a code image, and a combination of a character and a code image.

8. The printing apparatus according to claim 3, wherein
when the post-processing performed first on the medium after printing by the printing unit is primary post-processing and the post-processing subsequently to the primary post-processing on the medium after printing by the printing unit is secondary post-processing, the primary post-processing is performed in a region of the (n+1)-th image and a region of the n-th image, in this order, on the medium, and the secondary post-processing is performed in the region of the n-th image and the region of the (n+1)-th image, in this order, on the medium, and
when the control unit compares the n-th post-processing setting information with the (n+1)-th post-processing setting information, and determines that it is necessary to change setting of the primary post-processing for the region of the n-th image on the medium, the control unit causes the printing unit to print a first change instruction that is an instruction to change the setting of the primary post-processing at a position between the n-th image and the (n+1)-th image on the medium, and
when the control unit compares the n-th post-processing setting information with the (n+1)-th post-processing setting information and determines that it is necessary to change setting of the secondary post-processing for the region of the (n+1)-th image on the medium, the control unit causes the printing unit to print a second change instruction that is an instruction to change the setting of the secondary post-processing at a position between the n-th image and the (n+1)-th image on the medium.

9. The printing apparatus according to claim 8, wherein
when the post-processing subsequently to the secondary post-processing on the medium after printing by the printing unit is tertiary post-processing, the tertiary post-processing is performed in the region of the (n+1)-th image and the region of the n-th image, in this order, on the medium, and
the control unit compares the n-th post-processing setting information with the (n+1)-th post-processing setting information, and when determining that setting of the tertiary post-processing for the region of the n-th image on the medium needs to be changed, the control unit causes the printing unit to print a third change instruction that is the change instruction of the setting of the tertiary post-processing at a position between the first change instruction and the n-th image on the medium.

10. The printing apparatus according to claim 8, wherein when characters are included in the first change instruction and the second change instruction, the control unit causes the printing unit to print the characters of the first change instruction and the characters of the second change instruction in different directions.

11. The printing apparatus according to claim 1, wherein when the setting of the post-processing needs to be changed, the control unit causes the printing unit to print information based on the post-processing setting information and an instruction to stop transport of the medium at a position between the n-th image and the (n+1)-th image on the medium.

12. The printing apparatus according to claim 1, wherein
the control unit is configured to set a plurality of print jobs included in the designated two or more print jobs to a collective print job group that is a group having a common denominator, and
comparison between the n-th post-processing setting information and the (n+1)-th post-processing setting information may be performed on a relationship between the n-th print job and the (n+1)-th print job included in the collective print job group.

13. The printing apparatus according to claim 12, wherein after printing on the medium based on the image data of the last print job included in the collective print job group is ended, the control unit causes the printing unit to print at least a part of the post-processing setting information associated with each of the print jobs included in the collective print job group at a position upstream of an image printed on the medium based on the image data of the last print job in a transport direction of the medium in print order of the print jobs or in reverse order of printing of the print jobs.

14. The printing apparatus according to claim 1, wherein
the print setting information includes cutting information that is information defining in what unit the medium is cut,
the control unit is configured to set a plurality of print jobs included in the designated two or more print jobs to a collective print job group that is a group having a common denominator,
when the cutting information is first cutting information, comparison between the n-th post-processing setting information and the (n+1)-th post-processing setting information is performed on a relationship between the n-th print job and the (n+1)-th print job included in the collective print job group, and
when the cutting information is second cutting information, the comparison between the n-th post-processing setting information and the (n+1)-th post-processing setting information is performed on all the print jobs associated with the post-processing setting information as the designated print jobs.

15. The printing apparatus according to claim 1, wherein the post-processing setting information associated with the print job is described in a header of the image data included in the print job.

16. A print control apparatus communicably coupled to a printing apparatus, comprising:
a storage unit configured to store a print job including image data;
a control unit configured to perform print setting on the printing apparatus based on print setting information including post-processing setting information indicating setting of post-processing to be performed on a medium on which an image based on the image data is printed and configured to cause the printing apparatus to print two or more designated print jobs among a plurality of print jobs stored in the storage unit, wherein
when n is an integer greater than or equal to 1, and an image printed on the medium based on image data of an n-th print job as an n-th print target by the printing apparatus among the two or more print jobs is an n-th image, and an image printed on the medium based on image data of a (n+1)-th print job as a (n+1)-th print target by the printing apparatus among the two or more print jobs is a (n+1)-th image, and the post-processing setting information associated with the n-th print job is n-th post-processing setting information, and the post-processing setting information associated with the (n+1)-th print job is (n+1)-th post-processing setting information, the control unit compares the n-th post-processing setting information with the (n+1)-th post-processing setting information to determine whether or not setting of the post-processing needs to be changed, and changes the print setting so as not to print information based on the post-processing setting information set to be printed at a position between the n-th image and the (n+1)-th image on the medium as the print setting for the printing apparatus when the setting of the post-processing does not need to be changed.

17. A printing apparatus comprising:

a printing unit configured to print an image on a medium based on image data;

a storage unit configured to store a print job including the image data; and a control unit configured to perform print setting on the printing unit based on print setting information including post-processing setting information indicating setting of post-processing to be performed on the medium on which the image is printed and configured to cause the printing unit to print two or more designated print jobs among a plurality of print jobs stored in the storage unit, wherein when n is an integer greater than or equal to 1, and an image printed on the medium based on image data of an n-th print job as an n-th print target by the printing unit among the two or more print jobs is an n-th image, and an image printed on the medium based on image data of a (n+1)-th print job as a (n+1)-th print target by the printing unit among the two or more print jobs is a (n+1)-th image, and the post-processing setting information associated with the n-th print job is n-th post-processing setting information, and the post-processing setting information associated with the (n+1)-th print job is (n+1)-th post-processing setting information, the control unit compares the n-th post-processing setting information with the (n+1)-th post-processing setting information to determine whether or not setting of the post-processing needs to be changed, and causes the printing unit to print at least one of a change instruction of setting of the post-processing and a stop instruction of transport of the medium when the setting of the post-processing needs to be changed.

18. A non-transitory computer-readable storage medium storing a print control program, the print control program being configured to perform print setting on a printing unit based on print setting information including post-processing setting information indicating setting of post-processing to be performed on a medium on which the image is printed based on image data included in a print job, and cause a processor to perform a print control function that causes the printing unit to print two or more designated print jobs among a plurality of print jobs, wherein when n is an integer greater than or equal to 1, and an image printed on the medium based on image data of an n-th print job as an n-th print target by the printing unit among the two or more print jobs is an n-th image, and an image printed on the medium based on image data of a (n+1)-th print job as a (n+1)-th print target by the printing unit among the two or more print jobs is a (n+1)-th image, and the post-processing setting information associated with the n-th print job is n-th post-processing setting information, and the post-processing setting information associated with the (n+1)-th print job is (n+1)-th post-processing setting information, the print control function compares the n-th post-processing setting information with the (n+1)-th post-processing setting information to determine whether or not setting of the post-processing needs to be changed, and changes the print setting so as not to print information based on the post-processing setting information set to be printed at a position between the n-th image and the (n+1)-th image on the medium as the print setting for the printing unit when the setting of the post-processing does not need to be changed.

* * * * *